(12) United States Patent
Maggenti et al.

(10) Patent No.: US 7,079,857 B2
(45) Date of Patent: Jul. 18, 2006

(54) METHOD AND APPARATUS FOR PROVIDING ARBITRATION IN A GROUP COMMUNICATION NETWORK

(75) Inventors: Mark Maggenti, San Diego, CA (US); Douglas M. Crockett, San Diego, CA (US); Eric Rosen, Solana Beach, CA (US)

(73) Assignee: Qualcomm Inc., San Diego, CA (US)

(*) Notice: Subject to any disclaimer, the term of this patent is extended or adjusted under 35 U.S.C. 154(b) by 457 days.

(21) Appl. No.: 10/045,121

(22) Filed: Oct. 17, 2001

(65) Prior Publication Data

US 2002/0077136 A1 Jun. 20, 2002

Related U.S. Application Data

(62) Division of application No. 09/518,776, filed on Mar. 3, 2000, now abandoned.

(51) Int. Cl.
*H04B 7/00* (2006.01)
(52) U.S. Cl. ............. 455/518; 455/41.2; 455/463; 379/202.01; 379/203.01; 340/825.38; 340/825.51
(58) Field of Classification Search ........ 455/518–519, 455/414.1, 435.1, 462, 463, 41.2, 500, 41.3, 455/90.2, 95, 458, 416, 515, 517, 435.3, 455/527
See application file for complete search history.

(56) References Cited

U.S. PATENT DOCUMENTS

| | | | |
|---|---|---|---|
| 5,387,905 A | 2/1995 | Grube et al. | 340/825.52 |
| 5,450,405 A | 9/1995 | Maher et al. | 370/58.2 |
| 5,479,477 A | 12/1995 | McVey et al. | 379/58 |
| 5,491,835 A | 2/1996 | Sasuta et al. | 455/34.1 |
| 5,511,232 A | 4/1996 | O'Dea et al. | 455/54.1 |
| 5,524,273 A | 6/1996 | Coley et al. | 455/17 |
| 5,530,914 A | 6/1996 | McPheters | 455/34.1 |
| 5,530,915 A | 6/1996 | Shaughnessy et al. | 455/51.2 |
| 5,530,916 A | 6/1996 | Schultz | 455/54.1 |
| 5,530,918 A | 6/1996 | Jasinski | 455/56.1 |
| 5,535,426 A | 7/1996 | Leigh et al. | 455/34.1 |
| 5,537,684 A * | 7/1996 | Cassidy et al. | 455/512 |
| 5,542,108 A | 7/1996 | Sasuta | 455/34.1 |
| 5,555,447 A | 9/1996 | Kotzin et al. | 455/72 |
| 5,564,071 A | 10/1996 | Liou et al. | 455/56.1 |
| 5,717,830 A * | 2/1998 | Sigler et al. | 455/426.1 |
| 5,850,611 A | 12/1998 | Krebs | 455/518 |

(Continued)

OTHER PUBLICATIONS

TR45; Data Service Options for Spread Spectrum Systems: Async Data and Fax Services; Mar. 1999.

*Primary Examiner*—Edward F. Urban
*Assistant Examiner*—Thuan Nguyen
(74) *Attorney, Agent, or Firm*—Philip R. Wadsworth; Robert J. O'Connell; John L. Ciccozzi

(57) ABSTRACT

A method and apparatus for arbitrating between a first communication device having floor control in a group communication network and a second communication device competing for floor control provides receiving a floor-control request from the second communication device, comparing respective priority levels of the first communication device and the second communication device, and granting floor control to the second communication device if the second communication device has a higher or equal priority level. In one embodiment, the controller receives the request for floor control from a push-to-talk (PTT) device.

20 Claims, 10 Drawing Sheets

U.S. PATENT DOCUMENTS

| | | | |
|---|---|---|---|
| 5,901,142 A | 5/1999 | Averbuch et al. | 370/329 |
| 5,914,958 A | 6/1999 | Chinitz et al. | 370/441 |
| 6,058,307 A * | 5/2000 | Garner | 455/428 |
| 6,411,815 B1 * | 6/2002 | Balasuriya | 455/512 |
| 6,832,251 B1 * | 12/2004 | Gelvin et al. | 709/224 |

* cited by examiner

SIP CALL SIGNALING

MEDIA SIGNALING MESSAGE SEQUENCE (PTT

MEDIA SIGNALING MESSAGE SEQUENCE (DORMANCY)

MEDIA SIGNALING MESSAGE SEQUENCE (PRIORITY ARBITRATION)

MEDIA SIGNALING STATE DIAGRAM

CD STATE DIAGRAM

METHOD AND APPARATUS FOR PROVIDING ARBITRATION IN A GROUP COMMUNICATION NETWORK

CROSS-REFERENCE TO RELATED APPLICATION

This application is a division of U.S. patent application Ser. No. 09/518,776, filed Mar. 3, 2000, now abandoned, which application is incorporated herein by reference in its entirety.

FEDERAL RESEARCH STATEMENT

The U.S. Government has a paid-up license in this invention and the right in limited circumstances to require the patent owner to license others on reasonable terms as provided by the terms of MDA904-96-G-0035 awarded by the National Security Agency.

BACKGROUND OF THE INVENTION

I. Field of the Invention

The present invention relates to point to multi-point communications systems. More specifically, the present invention relates to an apparatus and method for providing arbitration for competing users of push-to-talk communication devices in a group communication network.

II. Description of the Related Art

Point-to-multipoint communication systems have been used to provide communications generally between a central location and multiple users of the system. For example, dispatch systems using Land Mobile Radios (LMRs) have been used in trucks, taxis, buses, and other vehicles in order to communicate scheduling information between a central dispatch center and one or more corresponding fleet vehicles. Communications may be directed at a specific vehicle in the fleet or to all vehicles simultaneously.

Another example of a point-to-multipoint communication system is a wireless push-to-talk system. Such a system allows a group of individuals, each having a wireless communication device, to communicate with other members of the group. Typically, a push-to-talk system relies on a single frequency, or dedicated channel, over which communications are received by the wireless communication devices. In most systems, only one member may transmit information to the other members at a time. However, all members can listen to the dedicated broadcast channel to receive communications from the single member who is transmitting. Members desiring to transmit to other members of the system typically sends an access request by depressing a push-to-talk button on their respective communication device that allows the user sole access to the dedicated channel.

Push-to-talk systems are typically used in outdoor settings where a group of people, or members, require communications with each other in a "point-to-multipoint" fashion. Examples of push-to-talk system uses include workgroup communications, security communications, construction site communication, and localized military communications. The group of people requiring communications with each other is commonly known as a "net," each member of the net sometimes referred to as a "net member."

In a typical push-to-talk system, a dedicated channel, sometimes referred to as a broadcast channel, is used to transmit communications from one member to multiple other members of the net simultaneously. The dedicated channel may comprise a single channel or frequency, or a group of individual channels managed by a controller to imitate the single channel. In either case, only one member may transmit voice and/or data communications to the other member users at any given time. If another member attempts to transmit over the broadcast channel while another member is transmitting, interference between the two competing communications will occur, resulting in non-intelligible communications being received by the other net members.

SUMMARY OF THE INVENTION

The disclosed embodiments provide a novel and improved method and apparatus for providing arbitration for competing users of push-to-talk communication devices in a group communication network. In one aspect of the invention, a method for arbitrating between a first communication device having floor control in a group communication network and a second communication device competing for floor control includes the steps of receiving a floor-control request from the second communication device, comparing respective priority levels of the first communication device and the second communication device, and granting floor control to the second communication device if the second communication device has a higher or equal priority level.

In another aspect of the invention, a method for arbitrating between a first communication device being in a wake-up state in a group communication network and a second communication device competing for floor control includes the steps of receiving a floor-control request from the second communication device, comparing respective priority levels of the first communication device and the second communication device, and placing the second communication device in the wake-up state if the second communication device has a higher or equal priority level.

In another aspect of the invention, a controller for arbitrating between a first communication device having floor control in a group communication network and a second communication device competing for floor control includes a receiver, a transmitter, and a processor communicatively coupled to the receiver and the transmitter. The processor is capable of receiving a floor-control request from the second communication device, comparing respective priority levels of the first communication device and the second communication device, and granting floor control to the second communication device if the second communication device has a higher or equal priority level. In one aspect, the controller receives the request for floor control from a push-to-talk (PIT) device.

BRIEF DESCRIPTION OF THE DRAWINGS

The features and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The net broadcast service (NBS) system enables Internet Protocol (IP) communication devices to participate in a group voice and data conference. NBS is primarily a Voice over IP (VoIP) application. Voice communication is transmitted from a talker endpoint communication device to one or more listeners by encapsulating voice frames in IP datagrams. Data with voice may also be transmitted in this manner. The NBS system is described in U.S. patent application Ser. No. 09/518,622, filed Mar. 3, 2000 and U.S. patent application Ser. No. 09/518,985, filed Mar. 3, 2000, and are specifically incorporated by reference herein.

Figure 1:
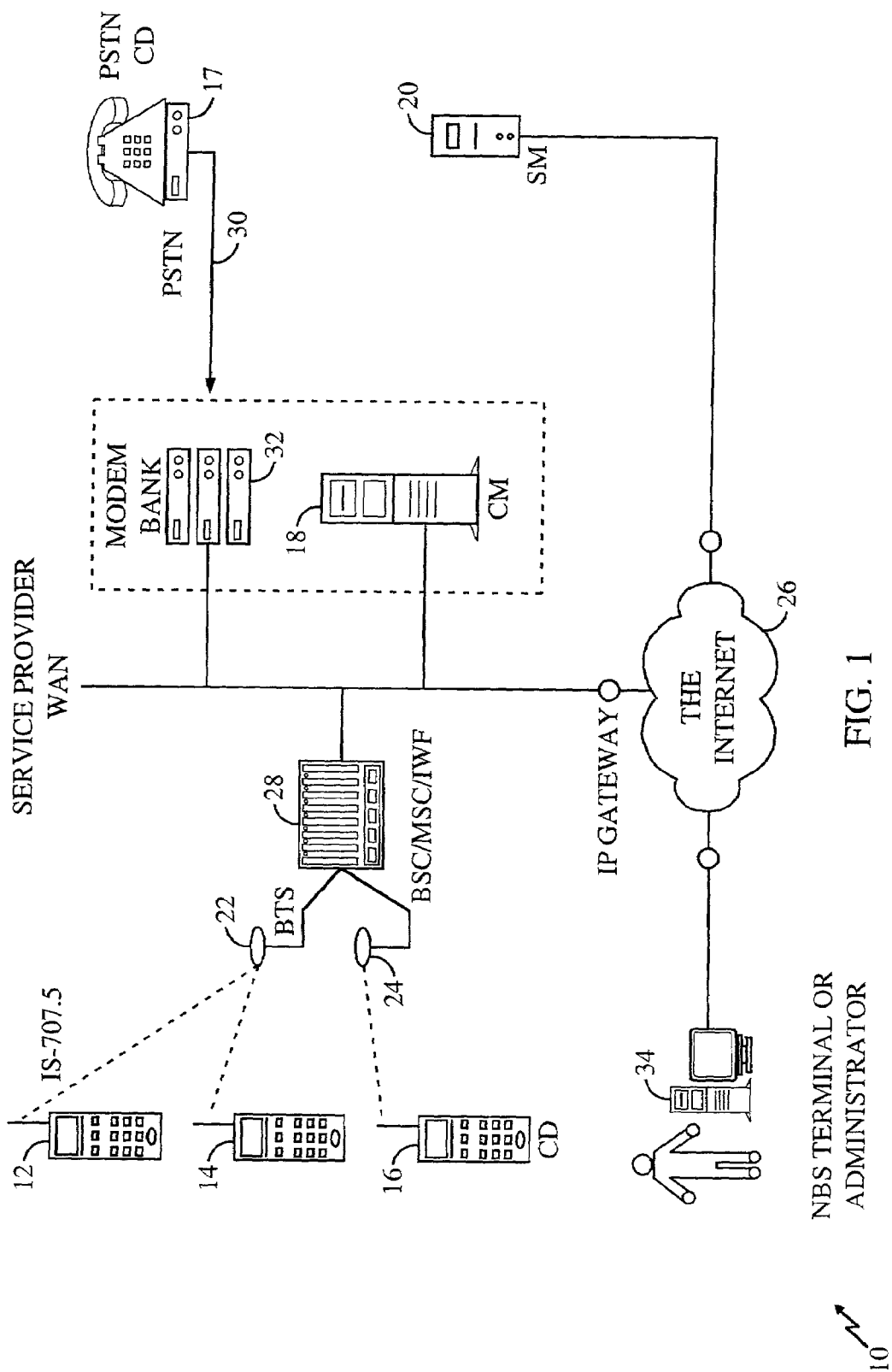
FIG. 1 illustrates a net broadcast system.

FIG. 1 illustrates a functional block diagram of a group communication system 10. The group communication system 10 is also known as a push-to-talk system, a net broadcast service (NBS), a dispatch system, or a point-to-multi-point communication system. A defining characteristic of such the NBS system is that, generally, only one user may transmit information to other users at any given time. In the NBS 10, a group of communication device users, individually known as net members, communicate with one another using a communication device assigned to each net member.

The term "net" denotes a group of communication device users authorized to communicate with each other. Generally, a central database contains information identifying the members of each particular net. More than one net may operate in the same communication system. For instance, a first net may be defined having ten members and a second net may be defined, having twenty members. The ten members of the first net can communicate with each other, but generally not to members of the second net. In other situations, members of different nets are able to monitor communications between members of more than one net, but are only able to transmit information to members within their own net.

The net operates over an existing communications system, without requiring substantial changes to the existing infrastructure. Thus, a controller and users on a net may operate in any system capable of transmitting and receiving packet information using Internet Protocol (IP), such as a Code Division Multiple Access (CDMA) system, a Time Division Multiple Access (TDMA) system, a Global System for Mobile Communications (GSM) system, satellite communication systems such as Globalstar™ or Iradium™, or a variety of other systems.

Net members communicate with each other using an assigned communication device, shown as communication devices (CD) 12, 14, 16 and 17. CDs 12, 14, 16 and 17 may be wireline or wireless communication devices such as terrestrial wireless telephones, wireline telephones having push-to-talk capability, satellite telephones equipped with push-to-talk functionality, wireless video cameras, still cameras, audio devices such as music recorders or players, laptop or desktop computers, paging devices, or any combination thereof. For example, the CD 12 may comprise a wireless terrestrial telephone having a video camera and display. Furthermore, each CD may be able to send and receive information in either a secure mode, or a non-secure (clear) mode. Throughout the following discussion, reference to an individual CD may be expressed by a wireless push-to-talk phone. However, it should be understood that reference to a CD is not intended to be limited as such, and may encompass other communication devices that have the capability to transmit and receive packet information in accordance with Internet Protocol (IP).

Figure 2:
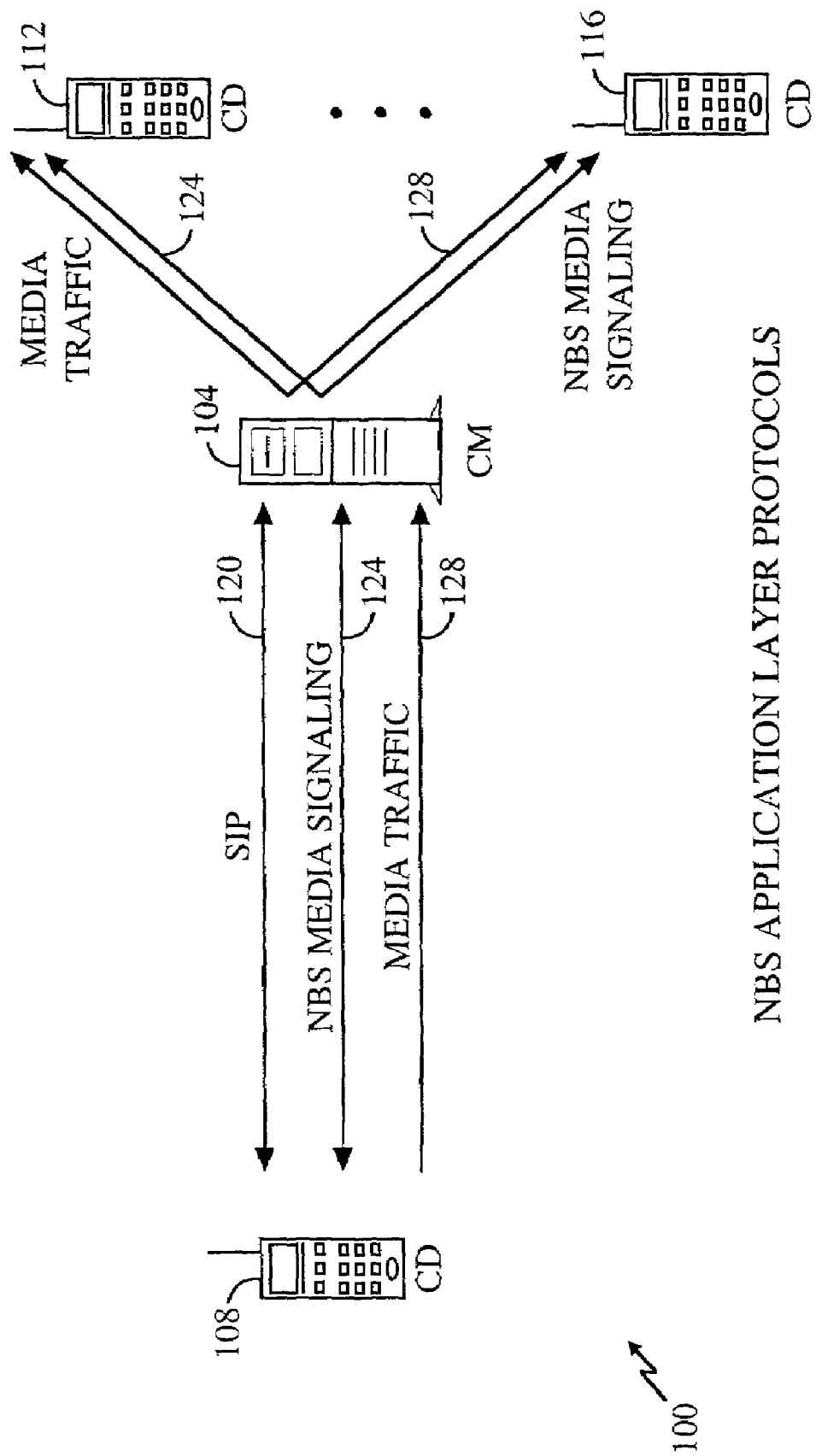
FIG. 2 illustrates a NBS net and how communication devices interact with a communications manager (CM) 104.

In the NBS system 100 of FIG. 2, a transmission privilege is defined that generally allows a single user to transmit information to other net members at any given time. The transmission privilege is granted or denied to requesting net members, depending on whether or not the transmission privilege is currently assigned to another net member when the request is received. The process of granting and denying transmission requests is known as arbitration. Other arbitration schemes evaluate factors such as priority levels assigned to each CD in determining whether a requesting net member is granted the transmission privilege.

In order to participate in the NBS system 10, CDs 12, 14, 16, and 17 each have the ability to request transmission privilege from a controller or a communications manager (CM) 18. CM 18 generally manages the real-time and administrative operation of nets. The CM is any type of computer type device having at least one processor and memory. In an embodiment, the CM is a Sun Workstation Netra T1™.

The CM 18 maintains a list of defined nets, defined as either clear or secure. Transitions between clear and secure are generally not permitted. A secure net relies on encryption provided by the individual CDs to provide authentication and guard against eavesdropping. Encryption for secure nets is implemented on an end-to-end basis, meaning that encryption and decryption takes place within each CD. The CM 18 generally operates without knowledge of security algorithms, keys, or policies.

The CM 18 manages remotely through either a communication system service provider, net members, or both, assuming that authorization is provided by the service provider. The CM 18 may receive net definitions through an external administration interface. Net members may request administrative actions through their service provider or administrate net functions through defined systems, such as a member-operated security manager (SM) 20 that conforms to a CM 18 administration interface. The CM 18 can authenticate to high-grade commercial standards any party attempting to establish or modify a net.

The SM 20 is an optional component of the NBS system 10 that performs key management, user authentication, and related tasks to support secure nets. A single group communication system may interact with one or more SM 20. The SM 20 is generally not involved in the real-time control of a net, including net activation or PTT arbitration. The SM 20 may have administration capabilities compatible with a CM 18 interface to automate administration functions. The SM 20 may also be capable of acting as a data endpoint for the purpose of participating in a net, broadcast net keys, or simply monitor net traffic.

In one embodiment, the means for requesting the transmission privilege from a CD comprises a push-to-talk (PTT) key or switch. When a user in the NBS 10 desires to transmit information to other net members, the push-to-talk switch located on his or her CD is depressed, sending a request to obtain the transmission privilege from the CM 18. If no other net member is currently assigned the transmission privilege, the requesting user is granted the transmission privilege and is notified by an audible, visual, or tactile alert through the CD. After the requesting user has been granted the transmission privilege, information may be then transmitted from that user to the other net member.

In one embodiment of the present invention, each wireless net member establishes a forward link and a reverse link with one or more base stations 22 or a satellite gateway 24, as the case may be. The base station 22 is used to describe a communication channel from the base station 22 or the satellite gateway 24 to a CD. The satellite gateway 24 is used to describe a communication channel from a CD to a base station 22 or gateway 24. Voice and/or data is converted into data packets using a CD, the data packets suitable for a particular distributed network 26 through which communications to other users take place. In one embodiment, distributed network 26 is the Internet. In another embodiment, a dedicated forward channel is established in each communication system (i.e., a terrestrial communication system and a satellite communication system) for broadcasting information from each net member to the other net members. Each net member receives communications from other net members over the dedicated channel. In yet another embodiment, a dedicated reverse link is established in each communication system for transmitting information to the CM 18. Finally, a combination of the above schemes may be used. For instance, a scheme may be establishing a dedicated forward broadcast channel but requiring wireless CDs to transmit information to the CM 18 over an individual reverse link assigned to each CD.

When a first net member wishes to transmit information to other members of the net, the first net member requests the transmission privilege by pressing a push-to-talk key on his or her CD, which generates a request formatted for transmission over the distributed network 26. In the case of CDs 12, 14 and 16, the request is transmitted over-the-air to one or more base stations 22. A mobile switching center (MSC) 28 comprises a well-known inter-working function (IWF) for processing data packets, including the request, between the MSC 28 and the distributed network 26. For CD 16, the request is transmitted via satellite to satellite gateway 24. For the CD 17, the request is transmitted to the Public Switched Telephone Network (PSTN) 30, then to a modem bank 32. Modem bank 32 receives the request and provides it to the distributed network 26. A NBS terminal 34 monitors traffic of the NBS system through its connection to the Internet 26. Since the NBS terminal 34 is connected to the Internet 26, geographic proximity to net participants is not necessary.

If no other member currently holds the transmission privilege when the transmission privilege request is received by CM 18, CM 18 transmits a message to the requesting net member, notifying it that the transmission privilege has been granted. Audio, visual, or other information from the first net member may then be transmitted to the other net members by sending the information to CM 18, using one of the just-described transmission paths. In one embodiment, CM 18 then provides the information to the net members by duplicating the information and sending each duplicate to the net members. If a single broadcast channel is used, the information need only be duplicated once for each broadcast channel in use.

In an alternative embodiment, CM 18 is incorporated into MSC 28 so that data packets from supporting base stations are routed directly to CM 18 without being routed onto distributed network 26. In this embodiment, CM 18 is still connected to distributed network 26 so that other communication systems and devices can participate in a group communication.

CM 18 maintains one or more databases for managing information pertaining to individual net members as well as to each defined net. For example, for each net member, a database may comprise information such as the user name, account number, a telephone number, or dial number, associated with the member's CD, a Mobile Identification Number assigned to the CD, the current member's status in the net, such as whether the member is actively participating in the net, a priority code for determining how the transmission privilege is assigned, a data telephone number associated with the CD, an IP address associated with the CD, and an indication of which nets the member is authorized to communicate. Other related types of information may also be stored by the database with respect to each net member.

As part of the NBS infrastructure, the communications manager (CM) forms connections of individual communication terminals to form one talk group, or net. The CM comprises a variety of functional capabilities in hardware and software that are configurable in different ways to accommodate different applications. Generally, the CM provides capability to manage real-time, administrative, and authenticity operations of (NBS) nets, push-to-talk (PTT) request arbitration, maintenance and distribution of net membership and registration lists, call set-up and tear-down of necessary CDMA system and network resources, as well as overall control of net status.

The NBS net may be within a stand-alone deployable cellular system, or a large multiple site configuration. In the case of a large configuration, multiple CMs may be deployed geographically to form a single, integrated system, each operates as a plug-in module into existing cellular infrastructure. As such, new features introduced by NBS nets are available to cellular users without requiring modification to existing cellular infrastructure.

A function of the CM is to maintain a list of defined NBS nets. Each net definition includes a net identifier, a list of members, including phone numbers or other identifying information, user priority information, and other generic administration information. Nets are statically defined as either clear or secure, and transitions between clear and secure are not permitted. A secure NBS net typically uses media encryption to provide authentication and guard against eavesdropping. Media encryption for secure nets is implemented on an end-to-end basis, meaning encryption and decryption takes place within the communication device. The CM operates without knowledge of security algorithms, keys, or policies.

The CM receives net definitions through an external administration interface. Customers may request administrative actions through its service provider or administrate net functions through defined systems, such as a customer-operated security manager that conforms to the CM administration interface. The CM authenticates to high-grade commercial standards for any party attempting to establish or modify a net.

Before one embodiment of the invention is explained in detail, it is to be understood that the invention is not limited in its application to the details of the construction and the arrangement of the components set forth in the following description or illustrated in the drawings. The invention is capable of other embodiments and are carried out in various ways. Also, it is understood that the phraseology and terminology used herein is for purpose of description and should not be regarded as limiting.

FIG. 2 illustrates a NBS net 100 and how communication devices interact with a CM 104. Multiple CMs 104 may be deployed as desired for large-scale NBS nets 100. In FIG. 2, communication device 108, or a CD 108, has permission to transmit media onto the net. In this case, the CD 108 is known as the talker, and transmits media over a channel. When the CD 108 is designated as the talker, the remaining net participants, communication devices 112 and 116 (or CD 112 and CD 116) do not have permission to transmit media to the net. Accordingly, CD 112 and CD 116 are designated as listeners. If CD 116 is designated as the talker, CD 108 and CD 112 are designated as listeners, and so on.

As described above, each CD 108, 112 and 116 is connected to the CM 104 using at least one channel. In an embodiment, the channel is divided into separate channels comprising a session initiation protocol (SIP) channel 120, a NBS media signaling channel 124, and a media traffic channel 128. The session initiation protocol (SIP) channel 120 and the NBS media signaling channel 124 may be used at any time as bandwidth allows, regardless of being designated a talker or a listener, by any of the CD's 108, 112 and 116. The SIP is an Internet Engineering Task Force (IETF) defined application-layer protocol that describes control mechanisms to establish, modify, and terminate multimedia sessions operating over Internet Protocol (IP). SIP provides a general solution to call-signaling problems for Internet telephony applications by supporting means to register and locate users, mechanism that define user capabilities and describe media parameters, mechanisms to determine user availability, call setup, and call-handling.

The SIP channel 120 is used to start and end participation of a CD within the net 100. Optionally, a session description protocol (SDP) signal may also be used within the SIP channel 120. When the CD's participation within an NBS net is setup using the SIP channel 120, real-time call control and signaling between the CD and the CM 104 takes place using the NBS media signaling channel 124. Specifically, among other tasks, the NBS media signaling channel 124 is used for handling push-to-talk requests and releases, arbitrate between conflicting requests, or floor control, announce the beginning and end of information transmission, manage net dormancy, track endpoint connectivity, request and exchange net status, notification and error messages. The protocol of the NBS media signaling channel 124 minimizes the length of the most common messages, and to simplify the task of interpreting replies and responding to requests while retaining flexibility for future enhancements. The protocol of the NBS media signaling channel 124 also allows requests to be resent without adversely affecting protocol state.

Signaling traffic on the media channel 124 may further be differentiated into two categories: call setup and control signaling, which consists primarily of SIP invitation requests and acknowledgements, and media signaling, which is comprised primarily of real-time floor control requests and related asynchronous messages. Media traffic on the media traffic channel 128 is comprised of real-time point-to-multipoint voice and/or data broadcasts. Both messaging categories have unique functional attributes. In addition, each CD may issue Domain Name Service (DNS) client requests to facilitate mapping fully-qualified DNS hostnames to Internet network addresses.

Figure 4:
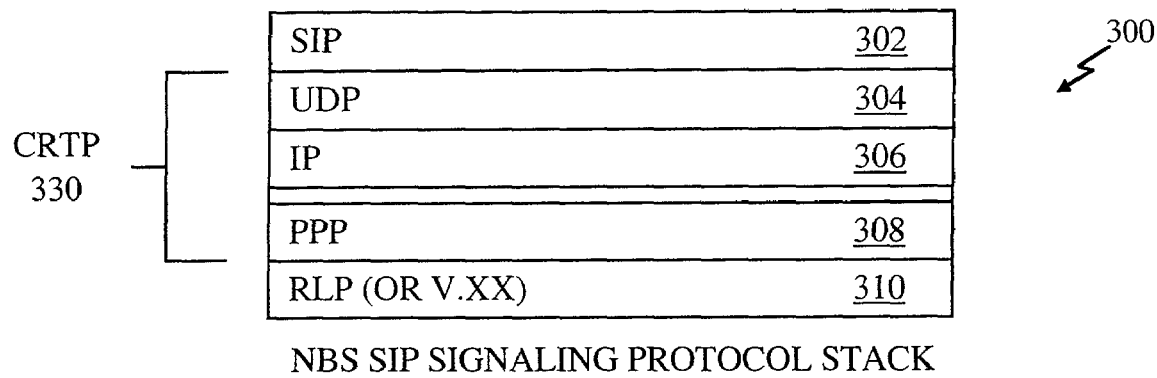
FIG. 4 illustrates an example of a NBS SIP signaling protocol stack.

NBS call setup and call control signaling is performed according to SIP semantics. Although SIP may be transported using either the well known User Datagram Protocol (UDP) or Transmission Control Protocol (TCP), in a preferred embodiment, each CD performs SIP based signaling functions using UDP, as illustrated in FIG. 4. Also, each CM expects to receive all SIP signaling requests via UDP. Real-time signaling occurs via dynamic UDP/IP interfaces on the CM and each CD. Other signaling may take place via a fixed TCP/IP interface between the CM and the CD using the SIP.

Figure 3:
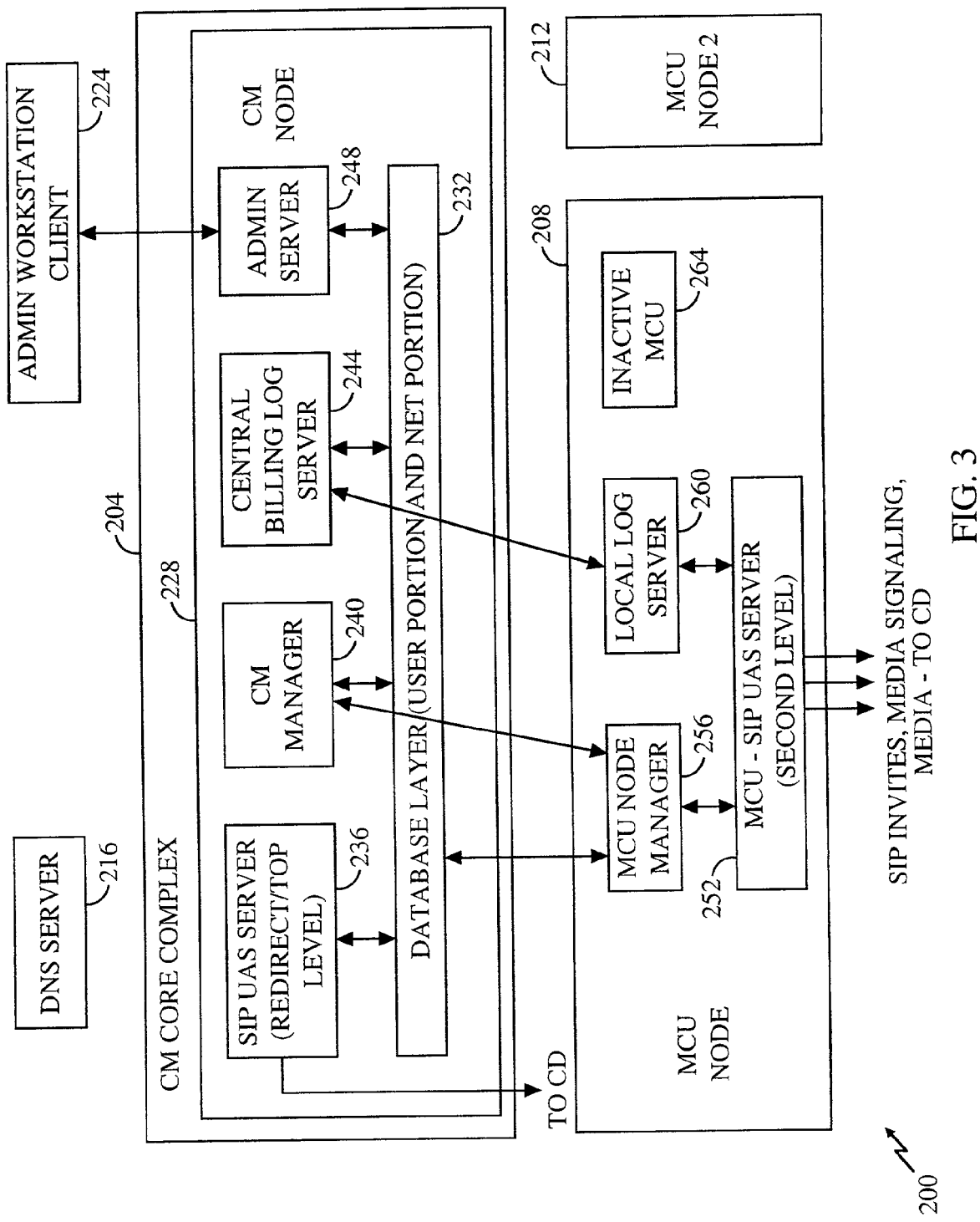
FIG. 3 illustrates a functional block diagram of the CM.

FIG. 3 illustrates the modules and physical make-up of the CM 200. The CM 200 comprises of a CM core module or complex 204, at least one net module, or media control unit (MCU) 208 and 212, a DNS server 216, a redirect server 220 and an administration workstation 224. The CM core complex 204 provides administration capability to a Java™-capable web-browser. One or more DNS servers 216 may also be included in the CM core complex 204. The CM core complex 204 further comprises a CM node 228 and a database server 232. The CM 200 is separable into at least two parts, the CM core complex 204 and each MCU node 208. After initial connection into the CM core complex 204, a net is operated by MCU node 208. The MCU node 208 sends and receives information as necessary from the CM core complex 204. The separability of the CM core complex 204 allows for versatility in that once a particular net is established, the net is operated by a dedicated MCU node 208. This allows CM core complex 204 to provide initial connections with other potential nets, irrespective of the type of communication structure in which the net wishes to operate. Also, the CM core complex 204 may be geographically displaced from the MCU node 208. For example, a single CM core complex 204 may be located in the central part of the United States, and a plurality of MCU nodes 208 may be located regionally to operate nets from its given region. As such, the CM core complex 204 may route a user to a particular MCU node 208 based on the location of the user.

Also, information may be provided to a user or group of users based on location, such as location-based broadcasting, directions, or identification of landmarks.

The CM node 228 provides centralized functionality associated with NBS nets. The CM node 228 comprises a session initiation protocol user agent server (SIP UAS) server 236, and CM manager 240, a central billing log 244, and an administration server 248. The SIP UAS server 236 supports user requests for net lists and handles SIP invite messages for nets. When a SIP invite message is received from a communication device, the net assigns the communication device to an appropriate MCU node 208, and directs the communication device to the MCU node 208.

The CM manager 240 monitors the status of all the MCU nodes within a net, and assigns the execution of nets to given MCU nodes, such as the MCU node 208. The CM manager 240 handles administrative functions pertaining to net administration, including the creation and deletion of nets, defining new and deleting existing users, adding and removing users as net members, and adjusting various operating parameters at a user, net, or CM wide basis.

The central billing log 244 maintains time and identification information for billing purposes. The central billing log receives billing log information from a local log server 260 of the MCU node 208. Detailed log information of each user, such as which communication devices are active on the net, for how long, from where, and when and for how long each CD is a talker or a listener, is maintained. The Administration Server 248 supports an interface to allow the Administration workstation 224 to retrieve status information, initiate database administration and system management functions through the net status interface.

The CM implements both the SIP user-agent server 236 and a SIP MCU server 252. To support NBS, each CD implements a SIP user-agent client. The CM receives incoming SIP connections on an advertised node, or port. When a connection occurs, the SIP server 236 receives and processes requests according to SIP call-signaling conventions. The SIP server 236 is capable of processing multiple call-signaling connections in parallel.

To conserve network resources, the CD may release its UDP connection with the SIP server 236 after it has successfully (or unsuccessfully) joined the NBS net 100. The UDP connection may be reinstated later to send additional SIP call-signaling requests (for example, to leave the net or switch to another net).

FIG. 4 illustrates an example of a NBS SIP signaling protocol stack 300. The stack is a collection of protocol layers that implements network communication. The protocol associated with each layer communicates with the layers immediately above and below it, and assumes the support of underlying layers. Because UDP is a less reliable connectionless transport, application level reliability is preferable to insure robust communication, which is achieved by implementing by SIP compliant endpoints. Generally, SIP call-signaling 302 on UDP streams 304 are encapsulated within IP protocol 306. No special formatting is required. SIP call-signaling IP packets 306 are exchanged between, for example, a CDMA cellular based CD or a dial-up PSTN based CD, which are encapsulated within point-to-point protocol (PPP) frames 308. Accordingly, no special formatting is required. Also, SIP call-signaling PPP frames 308 exchanged between a CDMA cellular based CD and a base station are encapsulated within a radio link protocol (RLP) 310. For dial-up PSTN based users, an appropriate modem standard, such as V0.32bis or V0.90, may replace RLP 310. In either case, special treatment is generally not required and an error-free physical link is not assumed.

Figure 5:
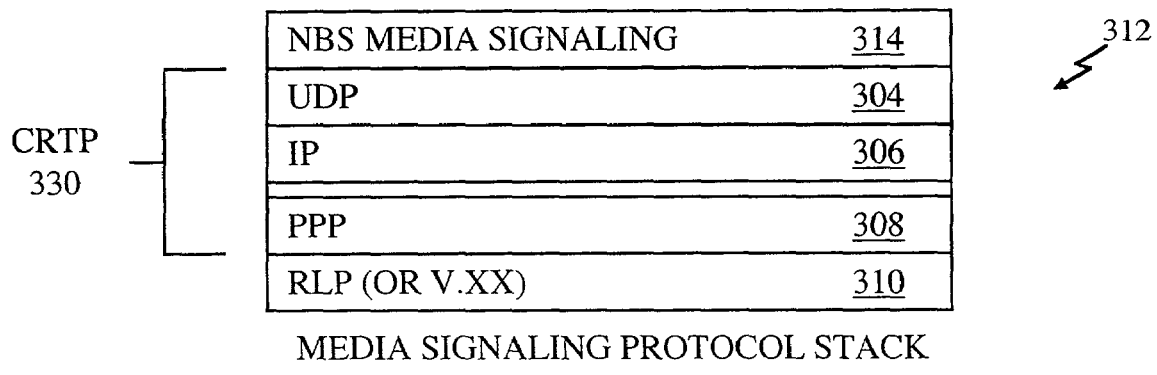
FIG. 5 illustrates an NBS media signaling protocol stack.

FIG. 5 illustrates an NBS media signaling protocol stack 312, transporting voice and data traffic using UDP datagrams 304 over IP 306. NBS media signaling 314 is layered onto UDP/IP traffic, and is handled in a similar manner with respect to the description of FIG. 4.

Figure 6:
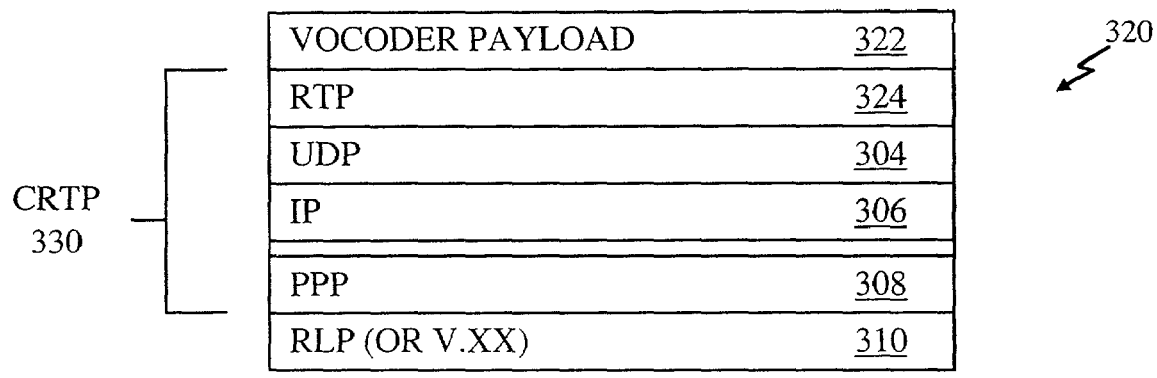
FIG. 6 illustrates real time protocol voice media protocol stack.

FIG. 6 illustrates a real-time voice-media protocol stack 320. In this embodiment, vocoder payload data 322 is layered on real time protocol (RTP) 324. RTP 324 is then layered onto UDP 304 and IP 306. In an optional embodiment, compressed real time protocol (CRTP) header compression 330 is used to further encapsulate media traffic using RTP 324 at the application layer. Header compression techniques may be applied as appropriate to all UDP/IP incoming and outgoing UDP/IP traffic illustrated in FIGS. 4-9. Media signaling requests and responses are encapsulated within UDP datagrams. When available, CRTP header compression may be applied to reduce the impact of sending uncompressed UDP/IP headers. In FIG. 6, CRTP compresses RTP layer 324, UDP layer 304, IP layer 306 and the PPP layer 308. In FIGS. 4, 5 and 7–9, CRTP 320 compresses the layers between and including UDP 304 to PPP 308.

In operation, each CD dynamically selects a UDP port on which it intends to listen for NBS media signaling requests and communicates the port number to the SIP server 236 as part of the SIP invitation it delivers when attempting to join a net. The net's CM media signaling destination address (including the UDP port number) is described in the net's session description delivered as part of a successful SIP INVITE request's response to the CD. Unlike SIP signaling addresses, media signaling destination addresses are net specific and may change between instances of a CD joining a net. Multiple nets hosted by the same CM generally operate independently and do not share media signaling or media traffic ports. However, it is contemplated that multiple nets may share media signaling and media traffic ports.

Referring to FIG. 6, voice traffic is encapsulated by grouping one or more vocoder frames within an RTP/UDP 324 or UDP payload 304. The use of RTP 324 with CRTP 330 enabled is used to minimize end-to-end media latency and provide interoperability with IP telephony applications and services. In either case, the CD dynamically selects the UDP port on which it expects to receive media traffic and communicates the port number to the SIP server 236 as part of the SIP invitation it delivers when attempting to join a net.

The net's vocoder and transport encapsulation protocol, as well as its media traffic destination address (including the UDP port number), is described in the session description response to a successful SIP invitation request from the SIP server 236. Like a net's media signaling addresses, the media traffic destination addresses are net specific and may change between instances of a CD joining a net.

Figure 7:
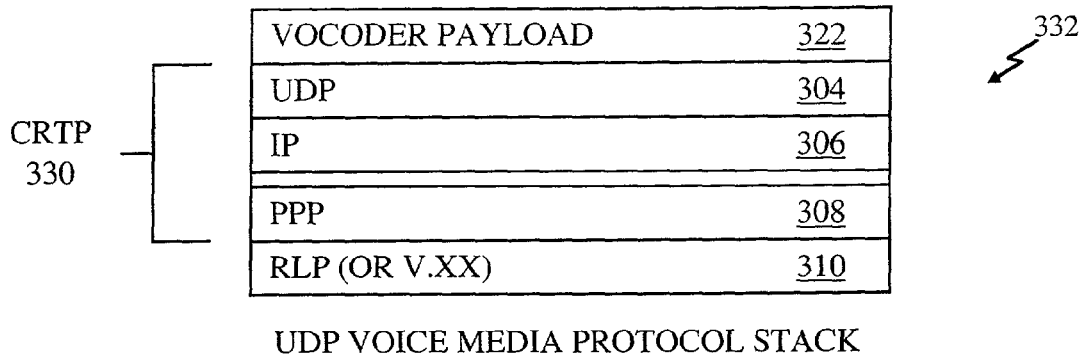
FIG. 7 illustrates a UDP voice media protocol stack.
Figure 8:
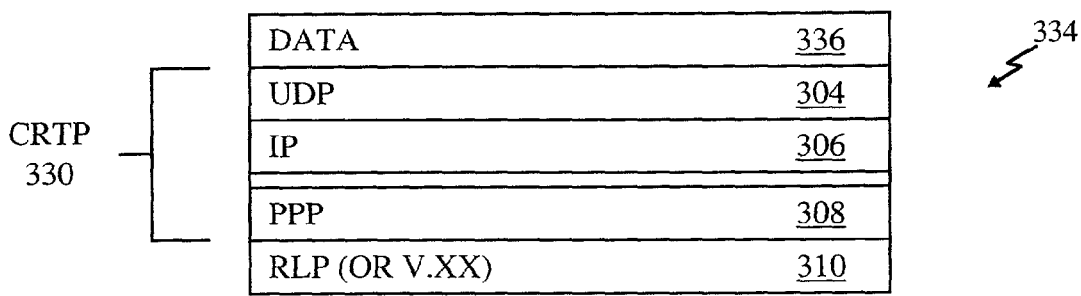
FIG. 8 illustrates a media traffic protocol stack.

Typically, as shown in FIG. 6, voice traffic is encapsulated at the application layer using RTP 324, which segments each UDP datagram 304 into a RTP header 324 and vocoder payload 322. FIG. 7 illustrates a UDP voice media protocol stack 332. Voice traffic may optionally be encapsulated purely using UDP datagrams 304, with no RTP encapsulation, typically when CRTP header compression 330 is unavailable or unsupported by a net member. FIG. 8 illustrates a media traffic protocol stack 334. The media traffic protocol stack 334 is used for net participants with no application-level RTP encapsulation. Data 336 is encapsulated into UDP datagrams 304.

The structure of the UDP payload 304 follows the definition given for a corresponding RTP payload 324, without the RTP header fields. The decision to encapsulate media directly into UDP 304 is configured by the net's administrator 248 and advertised by the net's session announcement. In addition to voice media, NBS nets may also support arbitrary data broadcasts. If a net supports a data broadcast channel, the SIP server 236 advertises the media type in the net's SIP session description when a CD formally joins the net.

Figure 9:
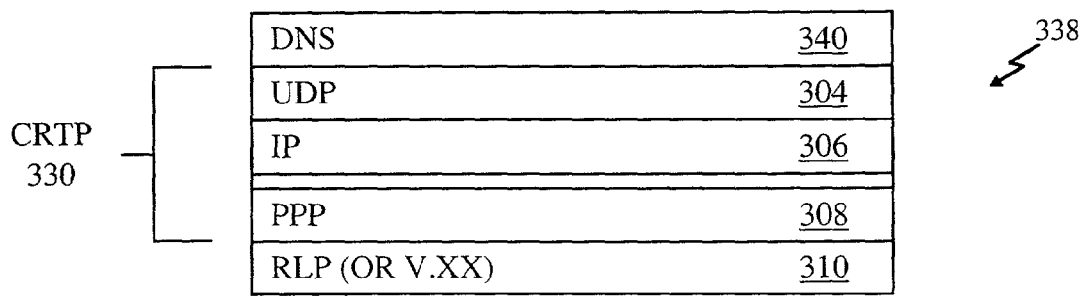
FIG. 9 illustrates a DNS client protocol stack.

FIG. 9 illustrates a DNS client protocol stack 338. Each CD includes the capability to resolve Internet domain names into Internet addresses using a Domain Name Service (DNS) protocol 340. The CD operates as a DNS client. The CD encapsulates DNS 340 requests using UDP 304, as shown in FIG. 9. In order for the CD to resolve DNS hostnames, the CD is provisioned with the IP network address of the DNS server 216, as shown in FIG. 3. The DNS address is also configurable by the CD service provider and, optionally, by the user.

In addition to voice media, nets may also support arbitrary data broadcasts, such as secure net rekey, email, data files, etc. If a net supports a data broadcast channel, the CM advertises the media type in the net's SIP session description when the CD formally joins the net. Like traditional media broadcasts, generic data broadcasts operate over RLP in one embodiment (or a corresponding physical layer) but are generally considered less reliable transports.

The CD includes the capability to resolve Internet domain names into Internet addresses using the Domain Name Service (DNS) protocol, as defined in RFC 1034. Alternatively, the CD operates as a DNS client or resolver, as described in RFC 1035.

In order for the CD to resolve DNS hostnames, the CD is preprogrammed with the IP network address of a DNS server. The DNS address is also configurable by the CD service provider and, optionally, by the user.

The CM 104 may optionally be configured to act as a DNS server 216. Although it may respond to DNS requests from foreign entities using TCP as the transport protocol, for the purpose of servicing requests originating with the CD, the SIP server 236 also encapsulates DNS messages using the UDP 304 according to FIG. 8.

The NBS also takes advantage of the development of a cellular multicast channel. Such a channel generically allows one transmitting station to address N listening stations directly over one forward channel, without the need for N separate rebroadcasts of the transmitted data. The presence of a cellular multicast channel implies changes to the NBS media stack primarily below the IP network layer. To take advantage of the efficiencies provided by a cellular multicast channel, a net's media signaling and traffic destination addresses are conventional IP multicast channels, and CM originated media signaling and traffic broadcasts are multicast broadcasts. Each CD originated media signaling and traffic broadcasts and SIP signaling remain as point-to-point communications.

The Radio Link Protocol (RLP) 310 shown in FIGS. 4-9 may be modified within each CD to minimize the latency experienced when link-layer (RLP frame) loss occurs. Such modifications are optional and do not necessarily affect the operation of transport of application layer protocols, since neither TCP nor UDP 304 assumes a reliable network (IP) or link-layer service.

A variety of the RLP 310 modification strategies are possible. For example, the RLP 310 may be modified to send multiple messages, such as NAK responses, after an initial RLP timeout, thus prompting the remote end to transmit multiple copies of the lost RLP 310 frame and improving the chances of a successful the RLP 310 recovery. The RLP 310 may also be modified to never send a NAK responses (after the RLP timeout expires) and allow dropped RLP 310 frames to force higher levels of the protocol stack to generate errors. Any application level protocols based on TCP recover routinely using TCP's error recovery mechanisms. Traffic relying on the UDP 304 for transport already contends with the potential for loss.

Referring back to FIG. 2, once the CD establishes participation within the NBS net 100 using the SIP channel 120, the CD is prepared to send and receive media from the net 100 on a specific media port of the CD over the media traffic channel 128. If the CD gains control of the floor through media signaling, as the case with CD 108 of FIG. 2, the CD transmits media to the destination network and transport addresses as indicated in the session description of the net 100. The CD decodes media received on its media ports according to the vocoder and media format defined in the session description of the net 100 received in an invite response when the CD joined the net 100. The CD codes and encapsulates media sent to the net 100 according to the vocoder and media format defined in the session description of the net 100 received in an invite response when the CD joined the net 100.

Each CD participating in a net determines the destination network and transport address for each media channel from the session description received from the SIP server 236 of the CM 104 and acknowledged during the SIP call set-up and use it to address corresponding media sent within the net 100. Each CD provides a packet data connection to the CM. Changes in the CD implementation of this interface may be made to optimize NBS performance. Changes to the infrastructure side of this interface are generally not necessary. The CD may optionally support most NBS activities using Quick Net Connect (QNC), as further described herein.

Upon delivery to a service provider, the CM manager 240 goes through basic administrative configuration before supporting NBS activities. Initial configuration involves basic system configuration such as assigning passwords to operating system level accounts for root-level system administration and configuring CM manager 240 network interfaces for proper operation on the local wireless infrastructure network.

Once the CM 104 is configured, general net administration can take place. Net administration functions take place through an HTML or other network interface built over TCP/IP. The administration workstation 224 interacts with the CM core complex 204 using a conventional World Wide Web (WWW) browser. Administration can take place locally or remotely (anywhere on the Internet, or via dial-up). However, the underlying transport path for administrative access is typically TCP/IP. Also, multiple (at least three) simultaneous administration connections are allowed.

Upon connecting to the CM core complex 204 for the purpose of net administration, the administrator workstation 224 successfully authenticates itself to insure that only authorized administrative actions are accepted. Different levels of access are accommodated; for example, authorized net members may connect directly to the CM's administrative interface 248 to modify specific net membership lists. More generic administrative privileges are generally reserved for specific administrative accounts. For clarity, administrative actions are generally separated into those that deal specifically with user definitions and those that define nets. A user definition comprises information such as the username, unique CD cellular system identifier, CD phone number, and user e-mail address. A unique user identifier is defined that may be passed to the CD and used to uniquely identify the user in signaling messages. A net definition comprises information such as the net-address, net hang-time, private dispatch timeout, and member list. A net's member list comprises of information such as of a list of member records, which individually contain a user identifier and priority level. A member with the minimal level of priority typically has listen-only privileges.

The CM administrator 248 may monitor the current status of nets for which they have administrative privileges. In particular, the CM administrator 248 may determine the current list of net participants, as well as monitor the net's state (active, inactive, dormant, in wake-up, etc.). Whenever the net is active, the CM administrator 248 may also monitor the identity of the current talker. Additional statistics and status, such as the length of current session, total talk time, mean number of registrants, etc., may also be available to administrators through the administrative interface.

The administration server 248 interface comprises of at least two network nodes, or ports. One is a TCP/IP based Hyper Text Transfer Protocol (HTTP) interface supporting administrative access through a conventional Java™-capable web browser. The second is a TCP/IP based NBS specific Command Lime Interface (CLI).

The administration server 248 makes all administrative functions available to a generic web browser via a HTTP web server interface with one or more pages formatted using an Internet readable medium, such as Hyper Text Markup Language (HTML) syntax. At least one of the administrative pages may include a reference to an embedded Java™ applet. Some administrative functions may optionally be performed through HTTP GET and POST commands issued by the web browser using conventional HTACCESS authorization mechanisms. The administrative functions supported are generally a subset of those supported by the CLI interface.

The HTTP interface may be used to deliver a Java™ applet to the web browser. The applet may then rely on the administrative server 248 CLI interface to provide additional administrative functionality to the user through a web browser interface. Prior to being granted access to the CLI interface, a potential administration workstation 224 connecting to the administrative server 248 CLI interface is authenticated. In a preferred embodiment, the CLI interface is reachable on a well-known, fixed, TCP port address and is able to simultaneously manage multiple CLI sessions.

The data base server 232 is responsible for storage of net information and parameters, net user information, status information associated with the MCUs 208 and 212, and the CM node 228. The database server 232 also serves this information to the remainder of the CM 104, such as the SIP server 236 and other modules that need such information. The database server 232 maintains databases that capture information that support NBS net activities, including an NBS net database portion and an NBS user database portion. Information supporting administration activities and privileges may be stored in either database, or a third functionally distinct database. The database server may be further subdivided into a user portion and a net portion.

CLI interface supports administrative functions such as CLI create user/net, delete user/net, modify user/net, list/show user, list/show net, status and help. The Create User function allows the administration server 248 to create new users in the user portion of the database, including specifying all user record fields. The Delete User function allows the administration server 248 to delete existing user records in the user portion of the database 232. The Modify User function allows the administration server 248 to modify existing user records in the user portion of the database 232, including modifying all record fields for a specific user.

The Create Net function allows the administration server 248 to create new nets in the user portion of the database 232, including specifying all net definition parameters. The Delete Net function allows the administration server 248 to delete existing nets in the user portion of the database 232. The Modify Net function allows the administration server 248 to modify existing nets in the user portion of the database 232, including modifying all net definition parameters for a specific net. The List User function allows the administration server 248 to list all users, by user name, dial number, and user identifier, in the user portion of the database 232.

The List Net function allows the administration server 248 to list all nets, by net-address and net identifier, in the net portion of the database 232. The Show User function allows the administration server 248 to show all fields for a specific user identified by the user's user identifier. The Show Net function allows the administration server 248 to show all fields for a specific net identified by the net's net identifier or net address. The Status function allows the administration server 248 to query for a static status report for a specific net. The Status function may also allow the administration server 248 to query for real-time (updated) reports. In particular, the status function identifies the current list of net participants, the current talker, the presence or absence of media traffic, and identifies any and all media signaling messages sent or received by the CM. The Help function allows the administration server 248 to query for a brief human-readable summary of each supported CLI command, including usage and syntax description.

The NBS user portion of the database 232 tracks individual users of NBS. The user records contained within the database 232 may or may not necessarily be members of net's defined in the CM's net portion of the database 232.

Each record in the user portion of the database 232 is comprised of fields such as user name, user identification, vocoder list, dial number, user type, CRTP support, CD user address, and CD pretty good privacy (PGP) public key. The vocoder list is a list of vocoders supported by the subscriber's CD. The list may include vocoders not supported by NBS. The dial number is the dial number of the subscriber's CD. This field is empty, or null, for generic Internet users. The user type is a type field describing whether the user is a CDMA cellular or generic Internet user. Users who connect via PSTN dial-up are considered generic Internet users. The CRTP support is a flag indicating whether the CD supports and attempts to negotiate CRTP Header Compression over PPP when connecting. This flag is valid for cellular as well as PSTN based users. The CD user address is the globally unique user address for the CD. A CD known by multiple user addresses will have multiple corresponding entries in the user portion of the database 232. The PGP public key is the key associated with the CD user address.

The NBS net database defines the set of nets known to the CM. The net portion of the database 232 also lists the defined members of each net; that is, those users who may request to join and become participants in a net. Each record in the net portion of the database 232 is comprised of a variety of fields. Fields include a net identifier, which is a unique integer identifying the net within the context of the CM. Fields also include a net-address, which is the SIP compatible net-address of the net. Net owner(s), a non-empty list of users, is identified by user identifiers who have administrative privileges (defined separately) for the net. Also, net security status is a field for a flag indicating whether the net is clear or secure.

Fields also include arbitration scheme, which is a unique value identifying the arbitration scheme used to resolve PTT arbitration conflicts between net participants. Net vocoder describes a field having a unique value identifying the standard vocoder shown in the net's advertised session description. Defined members of the net have this vocoder listed in their list of supported vocoders. PTT fail-safe timeout is the maximum number of seconds a net participant may transmit media to the net before the CM revokes control of the floor with a PTX denial message. Hang-time timeout value is the maximum number of seconds the net may remain idle before the CM will place it in the dormant state. PTX Dormancy Response timeout value is the maximum number of seconds the CM waits after determining that a dormant net's floor can be granted before transmitting the PTX grant response to the requesting CD. Wake-up timeout value is the maximum number of seconds the CM waits for net participants to respond to the AYT "wake-up" message before granting an outstanding PTT request. Late-riser timeout value is the maximum number of seconds the CM waits for a CD to respond to the CM's AYT "wake-up" message before the CM will remove the non-responding CD from the net's list of active participants. AYT timeout value is the maximum number of seconds the CM waits for a CD to respond to a CM's AYT message before the CM removes the CD from the net's list of active participants. Media channels list is a list of media channels, including payload specifications, for the net (nets list at least one media channel, which transports voice).

The net membership list defines the set of users who may request to join the net as participants and associated net specific privileges. Each entry in the list contains fields such as the user identifier, which is a unique identifier of a user listed in the CM's user database 232. Fields also include the user net priority level, which is the user's priority level to be used by the net's PTT arbitration algorithm in resolving PTT conflicts. A priority level of zero indicates that the user has listen-only privileges and may never be granted control of the net. Fields may also include a user authorization list, which details the authorization privileges, if any, the user has for the net. Privileges may include the ability to add, edit, or modify entries in the net's membership list and the ability to modify other net parameters.

Each CD maintains a database, also known as the group-list, identifying known nets that the CD may request to join. Each entry in the CD database includes fields such as net address, net security advisory flag, net traffic encryption key, and dormancy babysit timer. The net address is the net's formal SIP net-address that the CD uses to request to join the net as an active participant. The Net security advisory flag is the clear/secure advisory flag distributed by the CM's SIP server 236 in its list of available nets or set by the user to indicate that a net defined to carry Type IV secure media traffic. The net traffic encryption key is the traffic encryption key used to encrypt and decrypt all media traffic for Type IV secure nets. The dormancy baby-sit timer is the length of the interval, in seconds, the CD will wait when in the Dormant/Idle state between transitioning to the Connected state, confirming that the packet data call remains valid and the base station has not unilaterally dropped the connection.

The MCU node 208 comprises of an MCU 252, a MCU node manager 256 and the local log server 260. The MCU node 208 and 212 may also optionally comprise of an additional MCU 264. The MCU node 212 is substantially the same as the MCU node 208. For description purposes, only the MCU node 208 is discussed herein. The MCU 252 is responsible for control of a single active net. The MCU supports SIP, media signaling, and media interfaces for the net, and provides the functionality associated with the normal operation of the net. Each MCU node 208 may have a pool of MCUs 252 that may be directed to manage nets as appropriate. Each MCU 252 provides a MCU management interface to support functions such as starting, stopping, and status reporting.

The MCU node manager 256 monitors the operation of the MCU node 208 and manages the operation of each MCU 252 on its MCU node 256. The MCU node manager 256 also provides an external interface to the CM core complex 204 to allow for startup and/or shutdown, assigning a net to the node, and sharing of status information.

The local log server 260 locally records all log events for the MCU node 208. The local log server 260 also responds to requests from the central log server 244 via its log events interface. Requests include uploading certain event classes or priorities. In order to prevent loss of events, the messages are stored in the local log server 260 until an acknowledgement is received by the central billing log server 244.

The DNS server 216 provides name services to the NBS communication devices. The DNS server 216 may service SRV record requests. The DNS server 216 may be located anywhere on the network. In an embodiment, the DNS server 216 is a part of the CM core complex 204.

Each CD maintains a list of nets, or a group-list, internally representing the set of known nets in which the CD can participate. The list is non-volatile, but may be updated as needed either through interactions with a CM 104 or interactively by the user. The user is also able to determine who and how many users are either active or inactive in the net. The NBS group-list maintained internally by a CD is analogous in function to the list of names and dial-numbers maintained in the phonebook and used to facilitate voice-services. The NBS group list may be integrated with the phone's conventional phone book. In either case, the act of selecting a net from the group list instructs the phone to attempt to join the selected net.

In order to participate in a specific NBS net, each CD initially requests that the CM add itself to the list of active net participants for a specific net. Thus, each CD initially is aware or is able to learn the net-address of any nets in which it wishes to participate. Further, each CD initially knows or is able to be configured with the address of a top-level SIP server 236 to which SIP requests may be sent.

Net addresses may be provisioned or learned by a CD in several different ways. For example, in an embodiment the CD may be initially provisioned with the address of a known or default top-level SIP server 236 that provides a current list of nets in which the CD can participate. The CD may also be provisioned with a group-list, which defines at least one net-address in which the CD is a member. The CD may later send a request to the top-level SIP server 236 to update its group-list. In the event that no explicit NBS provisioning has taken place for the CD, the user may be provided with a top-level SIP server 236 and net address to interactively enter into the CD before using NBS. The user may also interactively enter additional net-addresses to a group-list that has already been provisioned with entries. Such a configuration step is analogous to entering personal names and dial-numbers into the conventional phone-book.

Note that although users may interactively enter a net-address into the CD group-list, the corresponding net and top-level SIP server 236 are preferably in existence and the user is needed to be listed as a member of the net in order for the CD to be able to successfully participate in the net.

The CD may also be provisioned with the IP network address of the primary Domain Name Service (DNS) server 216, to which the CD can send DNS queries. Typically, the address of the DNS server 216 operated by a CDMA cellular carrier is provisioned. The CD may also be provisioned with the IP network address of an alternate DNS server.

In order to support SIP authentication, the CD may be provisioned with a unique PGP user-id and secret key that it can use to sign SIP transactions when requested by the CM 104. The PGP user-id may also be used as the CD user address for generic SIP transactions.

Figure 10:
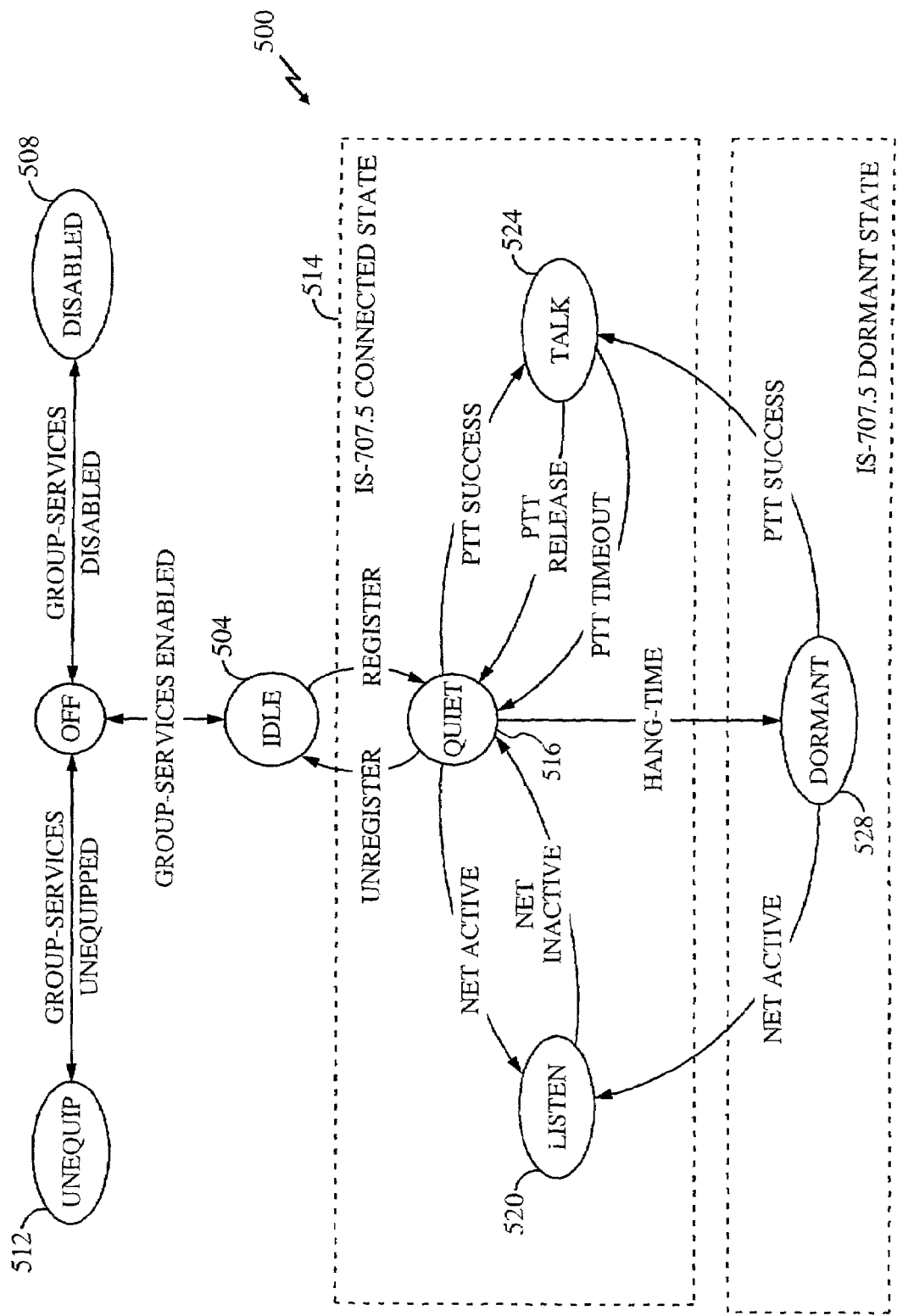
FIG. 10 illustrates the high level functionality of the group services module 500 of the CD.

FIG. 10 illustrates the high level functionality of the group services module 500 of the CD. Normally, the group services module is initialized to a default idle state 504 when the CD is powered on. From the idle state 504, the CD may transition to other states that allow it to actively participate in NBS nets.

The user may wish to temporarily disable NBS services through a menu option within the CD user-interface. If the user has disabled NBS services, the group services module defaults to a disabled state 508 when the CD is powered on. When disabled, the CD does not attempt to automatically join in any NBS nets. Further, the CD does not perform any NBS specific SIP transactions (the CD may maintain registrations or perform other SIP transactions for other IP based telephony applications residing within the CD).

Optionally, group services may be hidden entirely from the user by provisioning group services within the CD to an unequipped state 512. The unequipped state disables group services, where an equipped state enables group services.

Once unequipped, the CD requires administrative provisioning to equip group services. When group services are unequipped, the NBS group services functionality and related user interface features are not available to the user.

The CD may support over-the-air provisioning to equip NBS group services. In the event that the group-list of the CD contains more than one net-address, no more than one net-address may be identified as a default net 514. If a net-address is selected, the CD attempts to automatically transition from the idle state 504 by attempting to join this selected net shortly after the CD is powered on.

Figure 16:
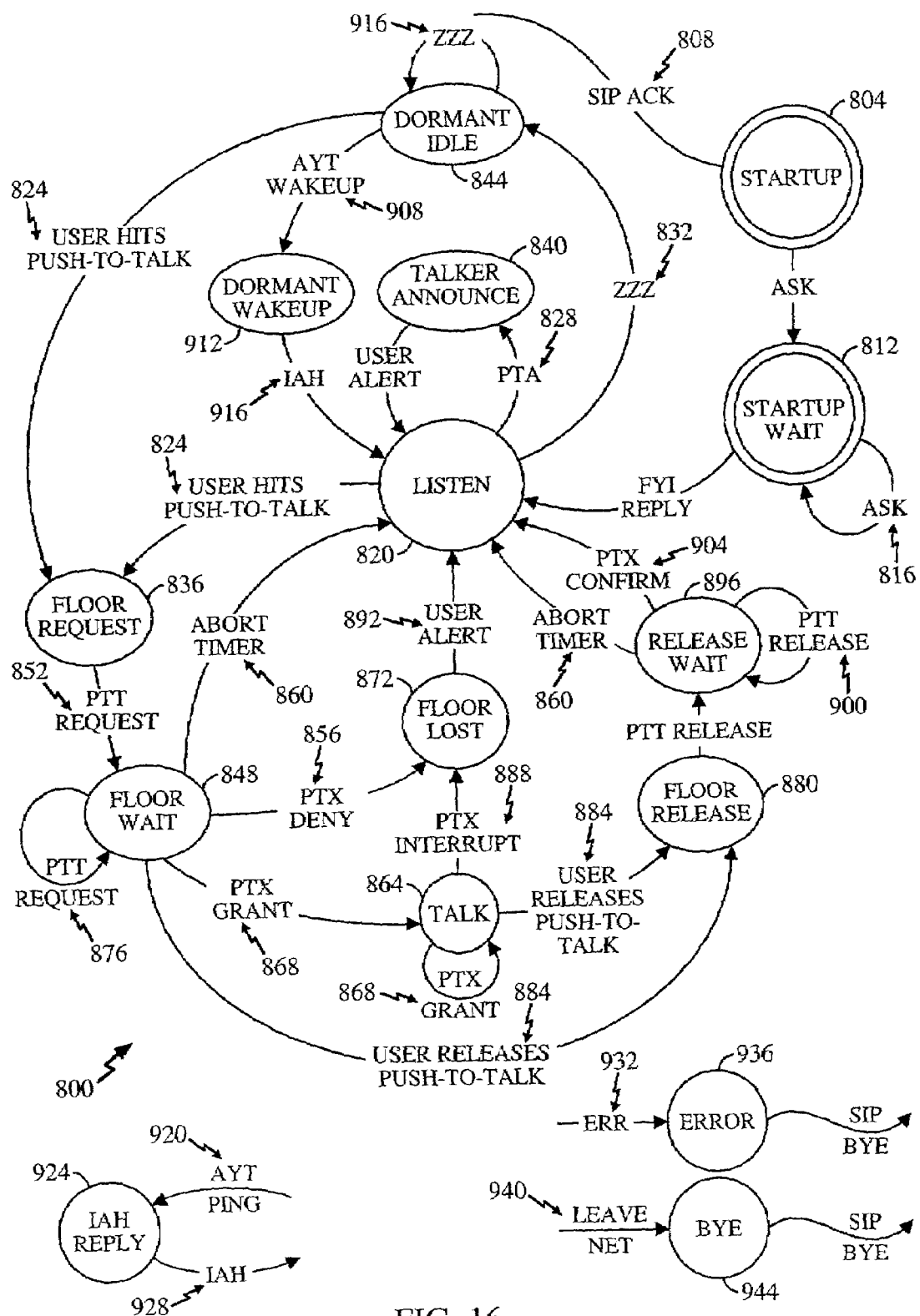
FIG. 16 illustrates a state diagram of the CD 352.

When the CD is connected, the CD cycles from a quiet state 516, a listen state 520, a talk state 524 and a dormant state 528 based on where the user is in the push-to-talk system as described with respect to FIG. 16.

The NBS relies on call signaling syntax and semantics as defined by the SIP to advertise available net-addresses and provide mechanisms by which an individual CD can formally join or leave nets. The CM 104, along with other functional entities, includes the a top-level SIP server 236, one or more multipoint control units (MCUs) 252 and associated SIP user-agent servers, and user and net portions of the administration database 232. The top-level SIP server 236 acts as a known rendezvous point to participate in the system. Each MCU 252 performs media signaling and media traffic switching for one or more nets. The database 232 stores and provides known user, administration, and net-address definitions and may serve multiple CM installations or be accessed remotely.

Each CD is provisioned with a list of net-addresses, and one or more top-level SIP server 236 addresses. If the group-list is empty, the user may interactively specify the address of an existing net. If no top-level SIP server 236 is defined, the user may interactively specify the address of a top-level SIP server 236. Once the top-level SIP server 236 address is known, the CD may request an updated list of nets available to it by placing a call using the SIP INVITE method to a pre-defined SIP destination.

The top-level SIP server 236 may redirect the request to an internal destination or respond to it directly. The INVITE response to this call includes the current list of nets available to the CD. The CD uses this list to update its internal group-list.

After a net has been selected, the CD attempts to join the net using the SIP INVITE method by specifying the net-address as the invitation destination and sending the request to the top-level SIP server 236. The top-level server 236 attempts to map the net-address to a known destination and, if successful, redirects the CD to the corresponding SIP user-agent server of the MCU 252. If no mapping is available, the invitation generally fails.

Normally, the destination SIP user-agent server of the MCU 252 confirms that the CD is a member of the selected net and responds to the invitation, embedding a description of the media traffic and signaling parameters to use to participate in the net in the content of its response. The SIP user-agent server of the MCU 252 may also reply with an error if it is unable to confirm the CD as a legitimate member of the net or if some other error condition arises, such as a failure that precludes normal net operation. If the invitation is accepted, the CD acknowledges the response through a message, such as the SIP ACK method. Note that other transient response codes that indicate call progress may also be received by the CD while the invitation is being processed.

The CD is responsible for updating its group-list to the set of the nets in which it may participate. The user may command the CD to query the database 232 of the CM 104, even when no net-address is selected, for the purpose of receiving updates to its group-list. If the CD determines that it has been added or removed from a net, it briefly displays an appropriate message to the user (for example: "Added to group X") and/or possibly prompt for user interaction. If the CD determines that is not a member of any net, it will similarly inform the user. The CD may automatically incorporate new net addresses into its group-list but may prompt the user before deleting addresses of nets in which it has lost membership from the group-list.

Generally, no more than one net in a CD's group-list may be identified as selected at one time. A default net may be initially selected or the user may select a net from the group-list.

The CM's SIP user-agent server of the MCU 252 response to an INVITE request to join a net includes, as embedded content, the net's media and real-time media signaling destination addresses, as well as other net parameters (such as media payload format descriptors). Once confirmed, the CD briefly displays feedback to the user, indicates whether the user has listen-only privileges, and enables group service functions. If the CM 104 determines that the CD is not a member of the selected net, or an error or other exceptional condition occur, the SIP server 252 responds with a corresponding error response. When such a registration is rejected, the CD briefly displays a corresponding error message and group service functions remain idle. If no net is selected, group services within the CD remain idle.

As part of activating group services, the CD initializes and opens its RTP media traffic channel 128 and the separate NBS media signaling channel 124 to the CM destination addresses provided in a successful invitation response. Once these channels have been initialized, group services are activated on the CD 108 and it enters the group-service quiet state 516 with the ability to receive voice traffic from the net and request permission to send voice traffic to the net.

With group services active, the CD 108 monitors its media traffic 128 and signaling channels 124 to the CM. Voice data received on the media traffic channel 128 is decoded and presented using a CD 108 far-field speaker or an ear-piece accessory, according to the current user configuration. The CD 108 displays the identity of the current speaker, as identified through real-time media signaling 124. If the identity of the current speaker is unavailable, the CD 108 displays the current selected net name as listed in the group-list. The CD 108 may also tabulate media traffic statistics (for example, total time spent talking, listening, and monitoring, estimated media traffic receipt packet loss) and make these available to the user as a diagnostic using a menu option. While receiving traffic from the net, the CD 108 transitions to the group-services listen state 520, returning to the quiet state 516 when voice traffic stops.

At any time, the user may request permission to speak to the net by depressing the PTT button and causing the CD 108 to signal the CM 104 (specifically, the MCU 252) with a floor-control request. The PTT button may be any type of activation command, including, but not limited to, depressing a key or sequence of keys, voice activation, a switch, a toggling device, or dials. The MCU 252 responds by either granting or denying the request. If the CD has listen-only privileges, such as CD 112, (that is, the CD has a priority-level of zero within the selected net), the request is denied. If denied, the CD 112 alerts the user with an error tone, displays a suitable error or explanatory message, and returns to the quiet state 516. The CD insists that PTT be released and depressed again before attempting another floor-control request. If granted, the CD 112 enters the group-services talk state 524, signals the user with, for example, a brief audible chirp, and begins transmitting voice traffic to the CM 104 for as long as PTT is keyed. The CM 104 may asynchronously signal the CD 112 (while PTT is keyed) that it has lost control of the floor. Upon receipt of such a signal, the CD 112 aborts transmitting voice traffic and alert the user with an error tone until PTT is released, at which point it returns to the quiet state 516. Otherwise, once PTT is released, the CD 112 signals the CM 104 that it has released the floor and returns to the quiet state 516.

A user may switch to a different net by selecting another net from the group-list whenever group-services within the CD 108 is in the quiet state 516, the listen state 520, or the dormant state 528. When a new net is selected, the CD 108 signals the CM 104 to remove it from the current net through SIP call-setup mechanisms and then follows similar procedures to join the new net. If the process of joining the new net fails, the CD 108 is no longer a member of any nets and group services within the CD 108 returns to the idle state 504.

If the CM 104 determines that the CD 108 requesting the floor of a particular net is the only registered member of the net in question, the CM 104 denies the floor-control request and signal an error message, such as a lonely-user error, which the CD 108 displays to the user. Although a net may exist with only one registered member, a net cannot relay voice traffic unless there are least two registered members.

Figure 11:
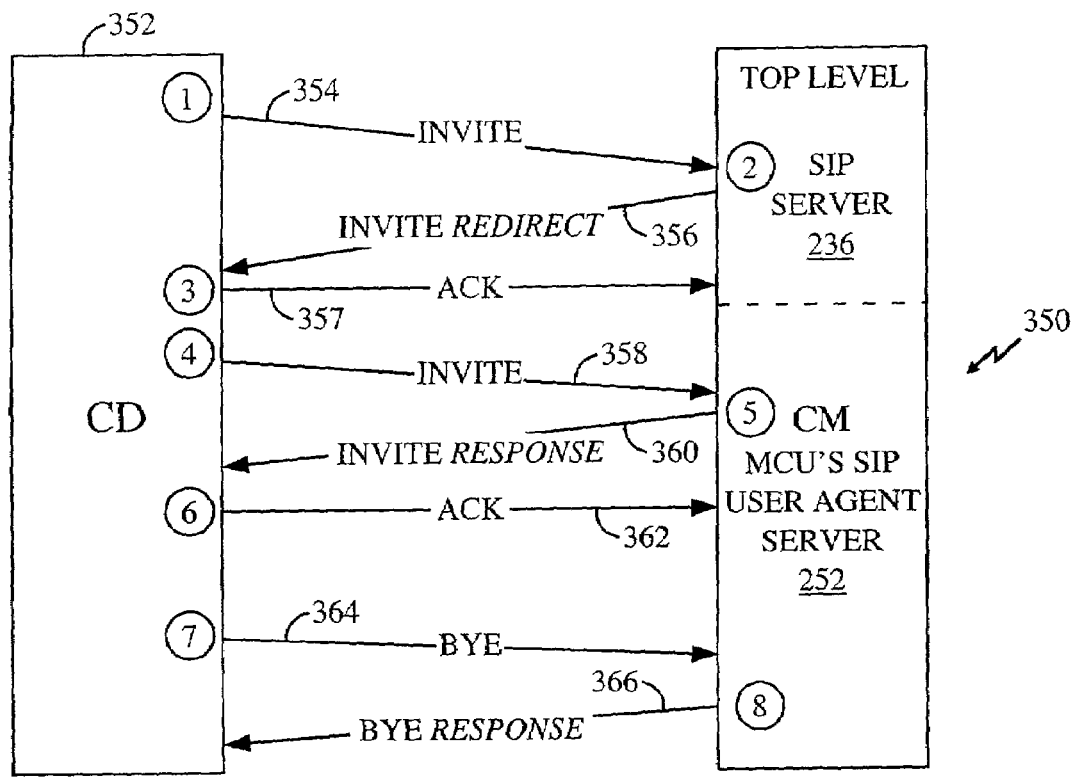
FIG. 11 illustrates SIP call signaling 350.
Figure 12:
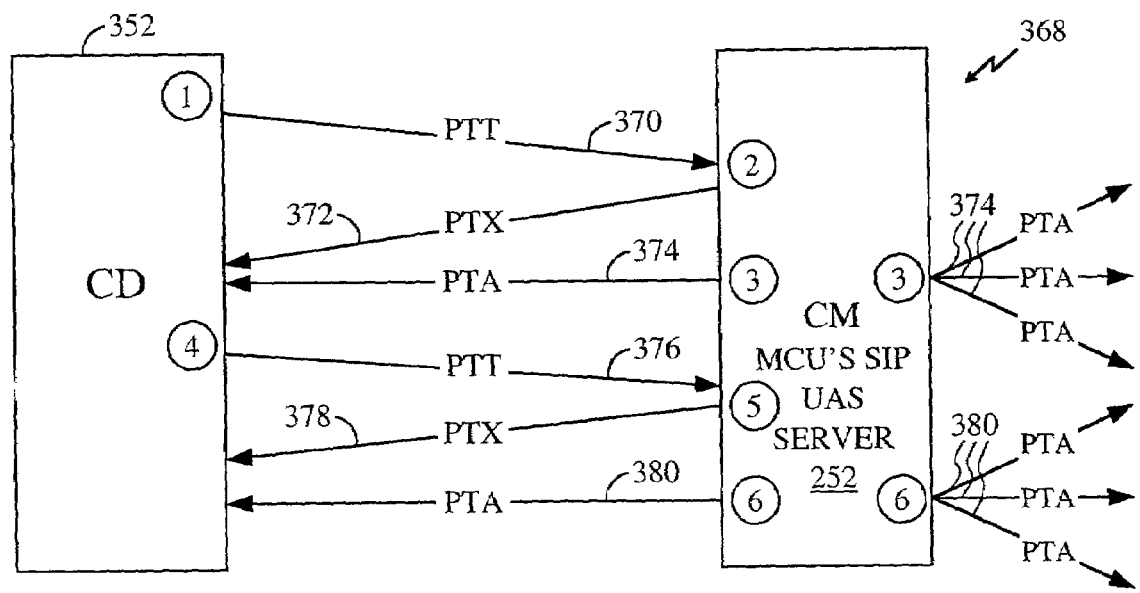
FIG. 12 illustrates a media signaling message sequence.
Figure 13:
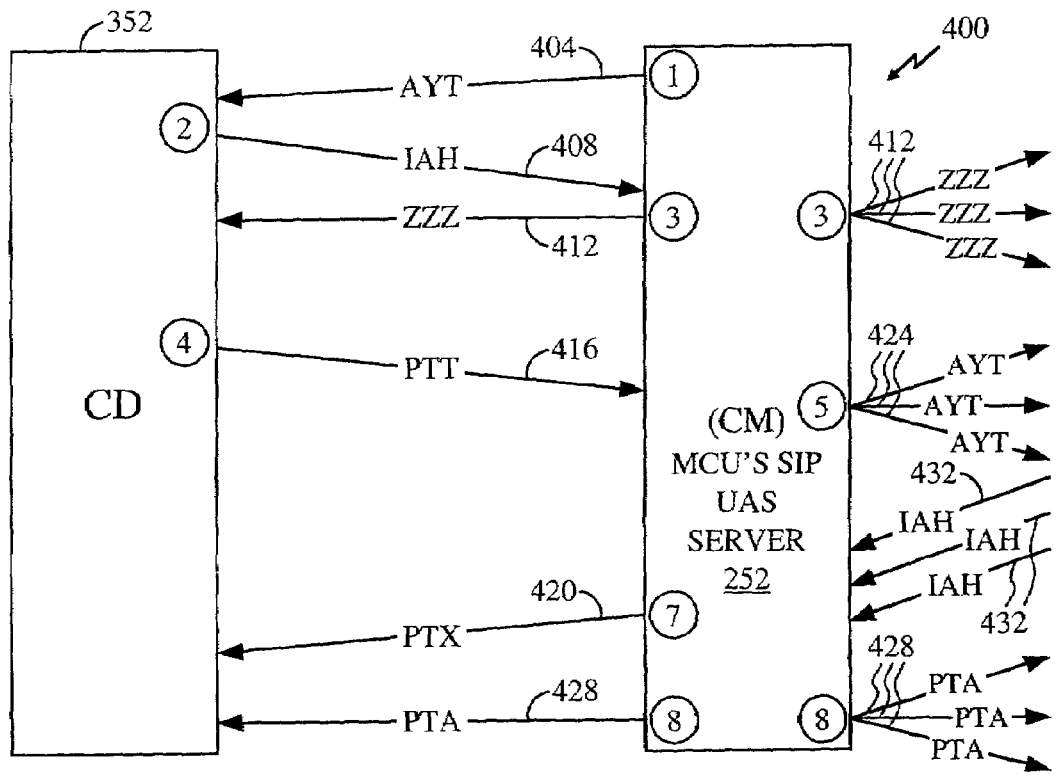
FIG. 13 illustrates the sequence of media signaling messages with respect to dormancy.
Figure 14:
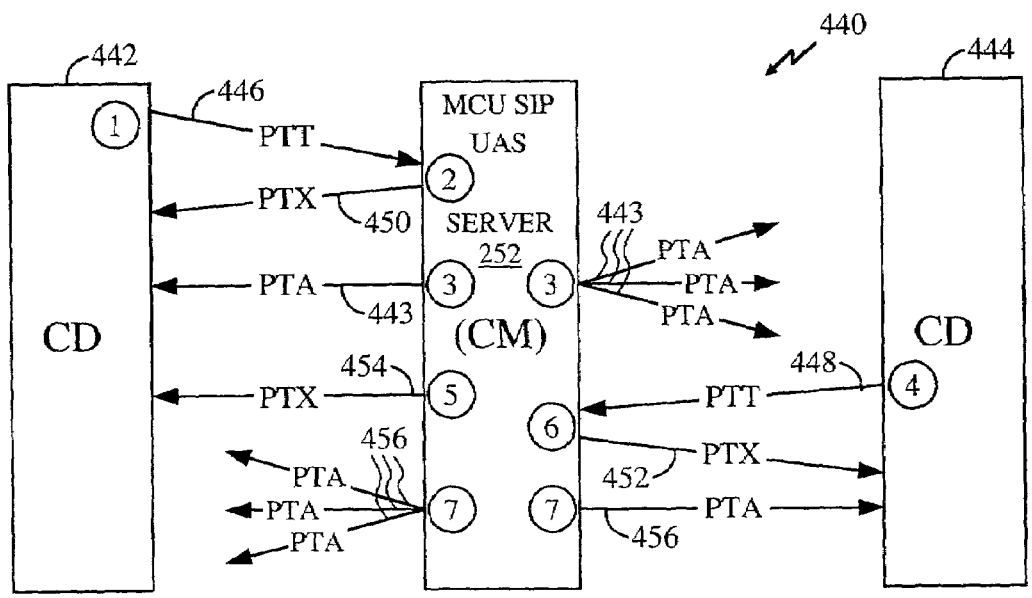
FIG. 14 illustrates a sequence of NBS media signaling messages.

The NBS application is based on two distinct application-level protocols: the Session Initiation Protocol (SIP) call signaling as described with respect to FIG. 11 and NBS Media Signaling as described with respect to FIGS. 12–14. SIP is used exclusively for call signaling and call setup. Media signaling carries PTT requests (FIG. 12) manages net dormancy (FIG. 13), and resolves PTT arbitration conflicts (FIG. 14).

SIP call signaling 350 is illustrated in FIG. 11. The Session Initiation Protocol provides NBS application-layer control (signaling) for discovering, joining and leaving NBS nets using the SIP server interface 236 of the CM 104. To join a net, a CD 352 invites the net 100, by name, to participate in a call, through the top-level SIP server 236. To leave the net 100, the CD 352 sends a corresponding "good-bye" to the net.

The CD 352 determines the IP address of the top-level SIP server 236 by using the DNS 216 to resolve the provisioned primary or secondary SIP server addresses into Internet network addresses, if necessary. As an optional alternate approach, SIP conventions allow the CD 352 to query the DNS 216 for service records associated with the NBS host system domain portion of the net address and contact the SIP server 236 at the returned address(es).

By default, the CD 352 attempts to contact the SIP server 236 using a default SIP port, unless alternate port information is determined through DNS 216. Prior to attempting to join a net, the CD 352 may place a call using the SIP INVITE method to request an updated list of available nets.

For example, the CD 352 that has brought up an over-the-air connection is assigned an IP address and wishes to determine its current list of available nets. This opens a UDP/IP connection to the SIP server port and issues a request. The request to obtain an updated list of nets is addressed to a special destination. When appropriate, the CD 352 also includes additional application-specific headers identifying the CDMA network and system from which a CDMA cellular based CD 352 is obtaining service.

The CD 352 may also include a header to indicate that the CD 352 expects that the SIP server 236 understands and supports NBS services. The option value distributed with the header can also be used by the CD 352 to inform the server 236 of a specific version or type of NBS services that the CD 352 expects the server 236 to support.

The CM's top-level SIP server 236 may redirect an invite request 356, using SIP redirection mechanisms, to a destination specifically defined to receive and respond to requests for net information. Upon receiving such a redirection, the CD 352 acknowledges (ACK) the response 357 and re-sends the request to the redirected destination.

The CD 352 may need to determine the appropriate SIP contact point for the redirected address, through DNS mechanisms. To simplify this process for the CD 352, the server 236 may specify the redirect destination explicitly using its Internet network address. Once an INVITE message 354 requesting a list of nets is successfully received and accepted by the server 236, the server 236 delivers an INVITE request response 356.

The INVITE request response 356 includes in its content a list of records defining the set of nets that the CD 352 may subsequently join. The server 236 queries its net database 232 for nets that list the requesting CD 352 as a defined member to form the response 356 to the INVITE request 354. Nets are identified within the content using an application defined record format that includes the formal net-address of the net. Nets may be listed in any order.

The server 236 may be unable to successfully respond to the CD 352 for a variety of reasons. In such circumstances, the server 236 delivers an appropriate SIP status code in place of the INVITE response 356. The CD 352 should be prepared to accept and interpret such status codes, taking appropriate action (such as displaying an error message on the CD 352 user interface display) in the case of any fatal errors. The server 236 may also preface a successful INVITE response 356 with informational status responses indicating the progress of the registrations. The CD 352 may accept and interpret informational status codes that preface successful registrations.

The CD 352 requests to join a net by issuing a SIP INVITE request 358 to the CM manager 240 through the server 252. If the CD 352 does not have an open UDP/IP connection to the SIP server 252, it will open a new UDP/IP connection to the SIP server port.

The CD 352 is prepared to be redirected by the top-level SIP server 236 and re-issue the request to the redirected destination if necessary. The CM's top-level SIP server 236 redirects any incoming INVITE request as appropriate to the MCU's SIP server 252 currently associated with the net in question. The CD 352 may be redirected more than once.

The INVITE request 358 may include a description (as message content) of the media sources that originates with the CD 352, assuming the invitation succeeds. If included, the description is included as message content and described using field constructions.

The session description is delivered in a format compatible with the Session Description Protocol (SDP). After defining the SDP version (v), the session description includes a mandatory origin (o) description. The CD 352 may use any convenient mechanism for choosing the values for the session identifier and session version. Providing an estimate of the current time is one possible way of defining the session identifier. Connection data (c) is specified by defining the network type, address type, and connection address. The CD 352 uses the IP address with which it labels (or source) media traffic as the connection address. The CD 352 uses the name portion of the net's net-address as the session name (s). The CD 352 specifies the lifetime (t) of the session by providing its best estimate of the start or current time, preferable in Network Time Protocol (NTP) format, and indicates that the session is unbounded (o). The media format (m) description defines the media type, source port, transport protocol, and payload format that the CD 352 intends to use to transmit to the net. Finally, the session description uses an attribute (a) type definition to indicate that the CD 352 expects the session to be operated as a NBS conference. The server 236 should confirm that the invited to address is indeed a valid NBS net address before granting the invitation.

To indicate a successful invitation, and specifically inform the CD 352 that it has been added to the list of participants for the invited net, the server 236 delivers an INVITE response 360.

A successful INVITE response 360 includes the primary session description for the invited net, which describes supported media traffic ports and formats using SDP syntax. The session description includes a connection (o) description that defines the network address to which all media signaling and traffic should be sent. The net's media destination network address is not necessarily the same as the SIP user-agent server's network address resolved using DNS from the net's net-address.

The session description describes all media and destination media ports. The session description should also include an identifier assigned to the CD 352 by the MCU 252 for the purpose of identifying media signaling messages transmitted by the CD 352 as part of its subsequent participation in the net. The value of this identifier is unique among all active participants on a given net and should thus be generated dynamically. The CD 352 does not necessarily cache this identifier between successful SIP invitations.

The session description may also include an NBS protocol version announcement indicating the revision level to which the net's media signaling adheres. Such an announcement may be implemented by extending the value of the type attribute field or defining a new attribute, whose value is the protocol version number.

After receiving a successful INVITE response, the CD 352 confirms the invitation by sending a SIP acknowledge (ACK) request 362 back to the net's MCU's SIP user-agent server 252. After transmitting the ACK request 362, the CD 352 may close its TCP connection with the SIP server. Prior to the ACK request 362 being transmitted, the CD 352 initializes its media signaling and traffic ports according to the session description delivered in the INVITE response 360.

At any time after the CD 352 has transmitted the SIP ACK message 362 in response to a successful INVITE response 360, the CD 352 may formally terminate its participation in the net by sending a SIP BYE message 364 to the net's user-agent server 252. Prior to sending the BYE message 364, the CD 352 may need to open a TCP connection to the user-agent server 252. The BYE message 364 is acknowledged by the CM with a BYE response message 366. Once the BYE response message 366 is acknowledged, the CD 352 may close its UDP connection with the user-agent server 252. Prior to acknowledging the BYE response message 366, the user-agent server 252 removes the CD 352 from the indicated net's list of active participants.

In general, a SIP user-agent client of the CD 352 may use the OPTIONS method to query a SIP server's capabilities. In particular, the CD 352 might wish to query an arbitrary SIP destination to determine whether the destination provides NBS call-signaling support.

The CD 352 may wish to abort a pending INVITE request 358 prior to receiving the INVITE response 360 and sending the acknowledgement 362. In such circumstances, the CD 352 may use a SIP CANCEL (not shown) method to gracefully abort the call. Both the top-level SIP redirect server 236 and the CM's SIP user-agent server 252 support the CANCEL method.

For example, the CD 352 may use the CANCEL method to abort an INVITE message 358 in progress if the user decides to place a voice-services call and presses send before the INVITE message 358 completes. In such a circumstance, rather than wait for the INVITE response 360 to complete and immediately send the BYE message 364, the CD 352 may simply immediately CANCEL the INVITE message 358 and proceed to place the requested voice-services call.

After the CD 108 has successfully negotiated entry into the current membership of a NBS net using SIP, all real-time call control takes place through point-to-point application level media signaling messages exchanged between each CD 352 and the net's MCU SIP server 252.

Media signaling messages are transported using the protocol stack depicted in FIG. 4, and in accordance to the sequence depicted in FIG. 12. FIG. 12 illustrates a media signaling message sequence 368. A PTT request message 370 is sent by the CD 352 to the SIP user agent server 252 of the MCU node 208 and signals a user's desire to broadcast media, usually voice, to the net. Normally, the PTT request message 370 is sent for each press of the CD 352 push-to-talk button to denote a floor-control request. In addition, a PTT release message is sent by the CD 352 to the SIP user agent server 252 to denote the normal release of the "floor" when the user releases the CD 352 push-to-talk button.

The PTT message comprises of fields such as the opcode, id, src, and reserved. The opcode field defines whether the PTT message is a floor-control request or release message. The id field provides a unique message identifier to allow subsequent PTT release and PTX messages to reference a specific PTT request. The id should be unique within the registration session of a particular CD 352. The src field uniquely identifies the CD 352 that sends the PTT request 370 to the SIP user agent server 252. The reserved field reserves space in the PTT message 370 for future capabilities.

The CD 352 expects to receive at least one PTX response message 372 for every transmitted PTT request 370. If a PTX response 372 is not received within a predetermined timeout period, the CD 352 assumes the PTT request 370 was lost in transit and retransmits the PTT message 370 using the same PTT id.

If a PTX response message 372 is never received from the SIP user agent server 252 within a predetermined number of retransmits, the CD 352 assumes that SIP user agent server 252 is no longer reachable, transitions to NBS idle mode, and indicates an error condition to the user. In a preferred embodiment, the CD 352 uses a different PTT id for the request and release messages.

The PTX message 372 is sent by the SIP user agent server 252 to a CD 352 to acknowledge and respond to a previous PTT request 370, as well as to signal asynchronous floor-control events. The SIP user agent server 252 uses the PTX message 372 to respond to a PTT floor-control request or release. The PTX message 372 includes information such as to whether the referenced floor-control request was granted or denied. When responding to a PTT floor-control release 370, the PTX message 372 is used to indicate confirmation of receipt only. The SIP user agent server 252 may also use the PTX message 372 to asynchronously deny a previously granted floor-control request (when a higher priority CD 352 issues a floor-control request, the PTX grant expires (i.e., times out), or some other event occurs requiring that control of the net's floor be revoked).

The PTX message 372 comprises fields such as opcode, id, action, status, and expires. The opcode field defines whether the PTX message 372 is a synchronous response to an outstanding PTT request, or if it is an asynchronous message indicating an error or priority arbitration conflict. The id field references a previously received PTT request. The action field indicates whether the PTX message 372 is granting, denying, revoking, or confirming control of the net's floor. The status field provides additional information explaining the PTX action, particular in cases when the PTX message 372 denies, revokes, or cannot act upon the prior PTT request. The status field may indicate that a higher priority talker has been granted control of the net, or that the CD 352 is not listed as a net participant and hence is not allowed to submit media signaling requests for the net. The expires field represents the maximum duration, in whole seconds, for which the control of the net's floor is granted to the receiving CD 352. The SIP user agent server 252 starts its timer from the instant it sends the PTX message 372 response, not when the CD 352 begins sending media traffic. The value of the expires field is a configurable net parameter.

The CD 352 does not explicitly acknowledge receipt of the PTX message response 372. Instead, if the transmitted PTX message response 372 is lost, the CD 352 PTT retransmit timer expires and the CD 352 retransmit its PTT request 370. Since the retransmitted PTT 370 has the same id as the lost PTX response 372, the SIP user agent server 252 responds by re-sending the lost PTX message response 370, rather than treating the retransmitted PTT message request 372 as a separate push-to-talk request event.

A PTA message 374 is sent by the SIP user agent server 252 to each CD 352 currently participating in a net to announce the identity of the source of pending media traffic. A PTA message 374 is also used to formally announce the end of a talk-spurt.

The PTA message 374 comprises fields such as opcode, talker, and reserved. The opcode field indicates whether the PTA message 374 is announcing the granting (or release) of the floor to (or by) the CD 352 identified by talker. The talker field identifies the CD 352, which sources media traffic to the net until the next PTA message 374 is sent. The reserved field reserves space in the PTA message 374 for future capabilities.

The CD 352 whose PTT floor-control request 370 was successful may or may not receive a PTA message 374 announcing it has control of the floor. The message may arrive before or after it receives the corresponding PTX response 372, since UDP does not necessarily preserve datagram ordering. However, the SIP user agent server 252 sends the PTA announcement 374 before it expects to begin forwarding media (in the case of a PTA grant announcement). It is recommended that the requesting CD 352 ignore received PTA messages 374 that announce it has won control of the floor and rely only on the receipt of a PTX grant message response 374 to determine whether it can begin transmitting media to the net.

An "are you there" AYT message 404 (FIG. 13) is sent by the SIP user agent server 252 to an individual CD 352 in order to confirm that the CD 352 in question is reachable using IP. A collection of AYT messages 404 may also be sent to a group of net participants in order to signal that a net is no longer in dormant mode.

The AYT message 404 comprises fields such as opcode, id, and reserved. The opcode field indicates whether the MCU node 208 is sending the AYT message 404 to determine whether the CD 352 is still reachable or if the SIP user agent server 252 is using the AYT message 404 traffic to bring the net's associated CDMA cellular traffic channels out of dormant mode. The id field provides a unique message identifier to allow a subsequent "I am here" IAH response message 408 to reference a specific AYT request message 404. The id may include a timestamp reference for generating latency estimates. The reserved field reserves space in the AYT message 404 for future capabilities.

The CD 352 may or may not be in dormant mode when an AYT message 404 is sent. In all cases, the CD 352 responds to a received AYT message 404 with an IAH response message 408.

The SIP user agent server 252 assumes that the CD 352 generally responds to an AYT message 404 with an IAH response 408. If an IAH response 408 is not received within a reasonable timeout, the SIP user agent server 252 transmits a new AYT message 404 with a new id. If after a configurable number of retransmits, a response to the AYT message 404 is not received from the CD 352, the CD 352 is assumed to be unreachable and the SIP user agent server 252 removes it from the current list of net participants. Future media signaling messages from the removed CD 352 will be ignored (or will generate an error response) until the CD 352 successfully re-joins the net.

The IAH message 408 is sent by the CD 352 to the SIP user agent server 252 to acknowledge receipt of a previously sent AYT message 404. The IAH message 408 comprises fields such as id, src, and reserved. The id field references a previously received AYT message 404 that the CD 352 is acknowledging. The src field uniquely identifies the CD 352 that sends the IAH message 408 response to the SIP user agent server 252. The reserved field reserves space in the IAH message 408 for optional capabilities.

The SIP user agent server 252 assumes that the CD 352 acknowledges all received AYT messages 404 with an IAH response message 408. If the referenced AYT message 404 was sent to confirm that a CD 352 remains connected in the NBS quiet state, passively monitoring NBS media traffic and signaling, the SIP user agent server 252 notes the time of the IAH receipt 408 for future reference.

Since the SIP user agent server 252 is responsible for defining the value of the id field, the SIP user agent server 252 may use the id to determine and track whether a specific CD 352 remains reachable.

The ZZZ or sleep message (illustrated in FIG. 13 as reference numeral 412) is sent by the SIP user agent server 252 to the CD 352 to encourage the CD 352 to release its over-the-air resources and enter dormant mode. The CD 352 may choose to ignore this message (especially if it is concurrently supporting other packet applications).

The ZZZ message comprises fields such as id and reserved. The id field provides a unique message identifier to allow the CD 352 to differentiate between multiple receipts of the ZZZ message. The reserved field reserves space in the ZZZ message for optional or future capabilities.

The CD 352 does not acknowledge receipt of the ZZZ message. Error recovery is generally not attempted if the ZZZ message is lost. To guard against a ZZZ message being lost, the SIP user agent server 252 may send multiple copies of the same ZZZ message to an individual CD 352. The SIP user agent server 252 insures that copies of the same sleep message are sent within a defined interval, and the CD 352 waits for a period longer than this interval from the time the first sleep message (with a new id) is received before releasing its over-the-air link and transitioning to a dormant state.

Figure 15:
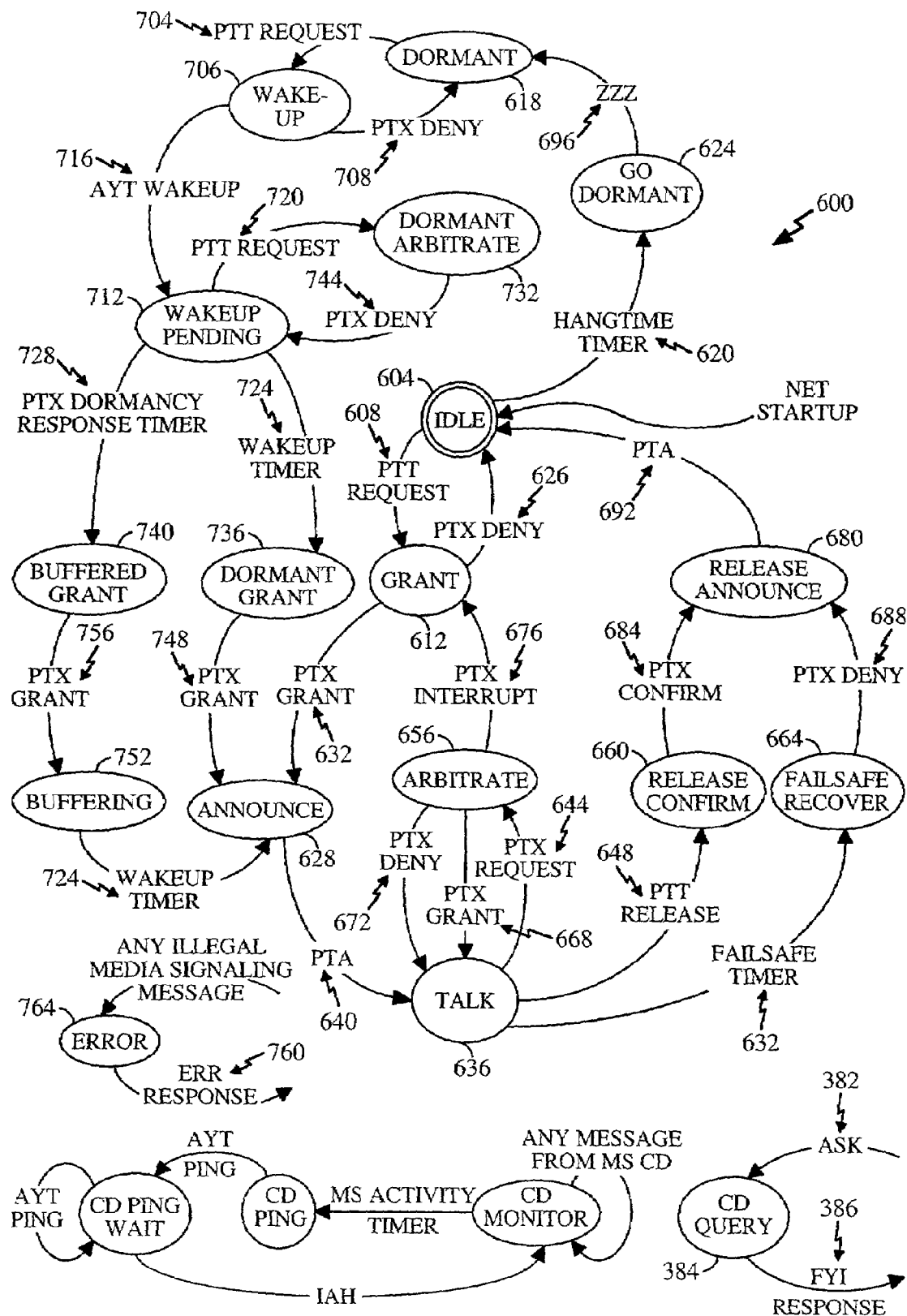
FIG. 15 illustrates a state diagram of the CM 104.

As illustrated in FIG. 15, an ASK message 382 is sent by the CD 352 as a query 384 to the SIP user agent server 252 to confirm connectivity with the SIP user agent server 252. The ASK message 382 also allows the CD 352 to determine whether the CD 352 remains listed as a net participant. The CD 352 may confirm its participation after a service-disruption or other period where it may have temporarily lost connectivity with the SIP user agent server 252.

The ASK message 382 comprises fields such as id, src and reserved. The id field provides a unique non-zero message identifier to allow a subsequent FYI response message to reference a specific ASK request message. The src field uniquely identifies the CD 352 that sends the ASK message 382 request to the SIP user agent server 252. The reserved field reserves space in the ASK message 382 for optional or future capabilities.

The CD 352 assumes that the SIP user agent server 252 responds to a received ASK message 382 with an FYI response message 386. If an FYI response 386 is not received within a predetermined timeout period, the CD 352 transmits a new ASK message 382 with a new id. If after a configurable number of retransmits, a response to the ASK message 382 is not received from the SIP user agent server 252, the SIP user agent server 252 is assumed to be unreachable and the CD 352 transitions to the group-service idle state.

The FYI message 386 is sent by the SIP user agent server 252 to the CD 352 to acknowledge receipt of a previously sent ASK message 382 or is sent asynchronously by the SIP user agent server 252 to inform the CD 352 of an exceptional condition.

The FYI message 386 comprises fields such as opcode, action, status, id, and reserved. The opcode field defines whether the FYI message 386 is a synchronous response to an outstanding ASK request 382, or if it is an asynchronous message indicating an exceptional condition. The action field indicates whether the FYI message 386 is confirming net participation, informing the CD 352 that it has been administratively deleted from the net's member list, or performing some other to be defined function. The status field provides additional information explaining the FYI response 386, particular in cases when the FYI message 386 indicates that the CD 352 is not a net participant or member. The id field references a previously received ASK message 382 that the CD 352 is acknowledging. In value of the id field is undefined for asynchronous FYI responses. The reserved field reserves space in the IAH message 408 for optional or future capabilities.

The CD 352 generally does not acknowledge receipt of FYI message 386 responses. If a synchronous FYI message 386 response is lost, the CD 352 sends a new ASK message 382 request. Because the CD 352 does not request asynchronous FYI message 386 responses, in a preferred embodiment the SIP user agent server 252 make at least three staggered transmissions of any asynchronous FYI message 386 responses.

A participating CD 352 signals a user's desire to broadcast media to the net by issuing a PTT message request 376 to the SIP user agent server 252. The SIP user agent server 252 responds to the PTT request 376 with a PTX message response 378 that may either grant or deny the request. If the request is granted, a PTA announcement message 380 is broadcast to all net participants. The user-interface of the requesting CD 352 may indicate to the user that permission to talk to the net has been granted as soon as the granting PTX message response 378 is received. The CD 352 normally broadcasts media traffic until the user releases the PTT button at which point it signals the end of the talk-spurt by issuing a PTT release message 376 to the SIP user agent server 252. The SIP user agent server 252 responds with a PTX confirmation message 378 and broadcasts an announcement signifying the end of the talk-spurt to all net participants.

When any CD 352 has the floor (the right to talk) of a net, the net is said to be active; otherwise, it is inactive. If a net is inactive for a time exceeding the net's hang-time, the SIP user agent server 252 may put the net in dormant mode by individually signaling all registered mobile stations to release their over-the-air traffic channels. A connection is maintained to allow a floor-control request or other traffic to bring the net out of dormant mode relatively quickly. Net members may ignore "go dormant" messages. The SIP user agent server 252 does not explicitly or implicitly track the dormancy status of individual net members.

As illustrated in FIG. 15, the SIP user agent server 252 will "wake-up" a net and bring it out of dormant mode 618 when a successful floor-control request 704 is received during dormancy. As soon as the floor-control request 704 has been granted, the SIP user agent server 252 will signal each registered CD 352 by requesting the are-you-there (AYT) message 716 over the media-signaling channel and start an internal wake-up timer 724. Each CD 352 acknowledges receipt of the AYT message 716 to the SIP user agent server 252 if it wishes to remain registered in the net. Optionally, a dormant CD 352 may buffer media traffic 740 from the time the user keys PTT until the CD 352 traffic channel is (re)connected. The SIP user agent server 252 may buffer media traffic 740 received from the talking CD 352 until the wake-up timer 724 exceeds the wake-up timeout, at which point, it begins forwarding media traffic to each registered CD 352, including any members that have not yet responded to the AYT request 716. Thus, both the CD 352 and the MCU node 208 have the ability to buffer data until the recipient is ready to receive the buffered information. In an embodiment, portions of data are stored both in the CD 352 and the MCU node 208.

The SIP user agent server 252 periodically retransmits AYT requests 716 to any registered CD 352 that has not acknowledged receipt of the AYT request 716. Once the wake-up timer 724 has exceeded a second longer late-riser timeout, the SIP user agent server 252 will unregister any member CD 352 whose AYT acknowledgement is outstanding and stop the wake-up timer 724. The SIP user agent server 252 ignores duplicate AYT requests.

If the CD 352 attempts to join a net that is currently dormant, the SIP user agent server 252 processes the request normally and then signal the CD 352 to go dormant. The signaled CD 352 may ignore the go-dormant command.

During periods of extended net inactivity, the NBS allows for a packet data service call to be placed in the dormant/idle state 528 (see FIG. 10). The SIP user agent server 252 facilitates transitions into and out of the dormant/idle state 528 by independently managing a similar dormancy concept for each NBS net 100.

FIG. 13 illustrates the sequence of media signaling messages with respect to dormancy 400 between the CD 352 and the SIP user agent server 252. In general, a message is sent to all CDs in the net to go dormant based on a control signal sent from the CM, based on a timer in each CD. As such, resources allocated to the net are released and may be used for other users. On a configurable schedule, the SIP user agent server 252 sends a message request (AYT) 404 to each CD 352 for the purpose of confirming that the CD 352 in a quiet state remains reachable. Thus, the CM 104 maintains centralized polling of current users of the net and their status. This also allows individual CDs to dynamically join or leave the net. The CD 352 responds to the AYT request 404 with a message response (IAH) 408. The AYT messages 404 are not necessarily broadcast to each CD 352 at the same time. The SIP user agent server 252 may stagger sending AYT messages 404 to each net participant to avoid receiving a flood of simultaneous IAH message responses 408.

After the net has been idle long enough for the net's configurable hang-time to expire, the SIP user agent server 252 broadcasts a ZZZ request message 412 to every net participant. In response, each CD 352 may release its over-the-air resources and enter dormant mode. Net participants need not necessarily respond to the ZZZ request message 412.

A successful PTT request 416 by the CD 352 brings the net out of dormant mode. In an embodiment, a predetermined threshold number of users are needed to respond in order to bring the net out of dormancy. Prior to granting the request with a PTX message 420, the SIP user agent server 252 sends every CD 352 an AYT message request 424 to force each previously participating CD 352 out of dormancy. This is done if the CD 352 chose to release its over-the air resources in response to the ZZZ message 412, and to confirm that the participating CD 352 still remains reachable. In another embodiment, After a configurable but fixed delay, defined as the PTX dormancy response timer, the SIP user agent server 252 transmits the PTX grant message response 420 to the requesting CD 352. Once a second wake-up timer (whose value is generally not less than the PTX dormancy response timer) expires, the SIP user agent server 252 announces the talker via a PTA message 428 to all net participants and may begin forwarding media.

The MCU node 208 is responsible for receiving incoming data packets from the transmitting CD 352 and for sending duplicate copies of the received data packets to other members of the net to which the transmitting CD 352 belongs. As each data packet is received by MCU node 208, it is stored in a memory (not shown). The transmitting CD 352 may be identified by interrogating the data packet. In one embodiment, an IP address representing the transmitting CD is included in each data packet as a way to perform the identification.

After the transmitting CD 352 is identified, the MCU node manager 256 retrieves a list of net members belonging to the net associated with the particular MCU node 208 from local memory (each MCU is typically assigned to one net only). A destination address is associated with each active net member, i.e., net members who are presently registered with MCU node 208, in local memory. In one embodiment, the destination address is an IP address. MCU node manager 256 then creates a duplicate of the original data packet, except that the destination address identified within the data packet is modified to reflect the destination address of the first net member. Next, MCU 208 creates a second duplicate data packet, addressed to the second net member. This process continues until the original data packet has been duplicated and sent to all of the active net members identified in local memory. During the play-out of any buffered media, the CM 104 treats the net as active, even if the talking CD 352 has released the floor. Hence, the CM 104 does not allow a CD 352 to interrupt the play-out of buffered media unless the interrupting CD 352 has higher priority than the source of the buffered media.

Note that the SIP user agent server 252 may receive IAH message responses 432 for an extended interval after the net is brought out of dormant mode and that the SIP user agent server 252 does not wait for all net participants to respond before granting the pending PTT request 416. Late responders whose IAH response 432 arrives after the PTX grant message response 420 is transmitted remains listed as net participants, but may not receive all initial media traffic and signaling. Any CD 352 that does not respond to the AYT request 424 after a third larger (and configurable) delay are generally assumed to no longer be reachable and are removed from the net's list of active participants.

FIG. 14 illustrates a sequence of NBS media signaling messages 440 demonstrating a higher priority CD 444 interrupting a lower priority CD 442 with control of the net's floor.

Initially, a lower priority CD 442 submits a FTT message request 446 to the SIP user agent server 252 that is granted by the SIP user agent server 252. The SIP user agent server 252 announces that the CD 442 has control of the net's floor.

While the lower priority CD 442 is transmitting media 443, a second CD 444 attempts to interrupt by sending the SIP user agent server 252 a PTT message request 448 for the same net. The SIP user agent server 252 determines that the second CD 444 has higher priority than the talking CD 442 and immediately revokes control of the net's floor from the talking CD 442 by sending it an asynchronous PTX denial message 454. The SIP user agent server 252 then grants the PTT request 448 to the higher priority CD 444 with a normal PTX grant message response 452 and announces that the higher priority CD 444 has control of the net's floor.

If the SIP user agent server 252 determines that the interrupting CD 444 does not have higher priority, the SIP user agent server 252 immediately rejects the PTT request 448 with a PTX message response 452 and continues to distribute media 456 from the talking CD to the net's participants without interruption.

Although the priority assigned to a particular CD is a fixed value defined in the database maintained by the SIP user agent server 252, the SIP user agent server 252 may use other arbitration algorithms that do not necessarily always grant the floor to the highest-priority requesting participant, as depicted here. The PTT arbitration algorithm used to arbitrate conflicts can be individually configured on a per net basis.

At a minimum, the SIP user agent server 252 supports an arbitration policy that allows a CD to interrupt the current talker only if the CD has a priority level that exceeds that of the current talker. An CD with minimal priority can listen to media traffic but never gain control of the net's floor.

FIGS. 15 and 16 illustrate operation of the CM 104 and CD 352, respectively, during various states. The CM 104 maintains an inactivity timer for each net, or the hang-time timer 620. When the inactivity timer 620 reaches a configurable prescribed value, the timer triggers the CM 104 to place the net in a dormant state 618 by broadcasting a media signaling message 696 to all net participants. Upon receipt of the message, a participating CD 352 may release its traffic channel and enter a dormant/idle state 844, or the CD 352 may ignore the message and remain in a connected state 820. In particular, net participants that are not operating over a channel, such as dial-up PSTN users, should ignore the media signaling messages.

The net's hang-time timer 620 does not advance for the duration that a PTX grant message response 632 is an effect. The timer 620 is reset to zero when the PTX grant message 632 is transmitted and remain at zero until the PTX grant 632 expires or the CD 352 releases the net's floor 872. Once the floor is released, the hang-time timer advances until the next PTX grant message response 632 is transmitted.

If a participating CD 352 enters the dormant/idle state 844, it remains dormant until either packet data addressed to the CD 352 arrives at the CD 352 MA cellular infrastructure or the CD 352 generates data to send using the packet data service. The former case may be triggered by traffic sent to the CD 352 by the CM 104 (908). The latter case may be triggered by the user keying the PTT button to request permission to broadcast 824 to the net. Other triggers unrelated to NBS are also possible.

The net itself remains dormant until one or more participants trigger the transmission of a PTT request 704. If the CM 104 determines it can grant the PTT request message 704 (including performing any necessary arbitration to deal with multiple requests) it sends a request 716 to each listed net participant to trigger a transition out of the dormant/idle state 844. For any specific CD 352, the trigger may or may not be necessary, but each CD 352 nonetheless responds to the request. In this circumstance, when a net is transitioning out of the dormant state 618, the CM 104 refrains from sending the initial PTX grant response message 756 until a fixed but configurable delay, the PTX dormancy response timer 728, expires. After the timer 728, whose default value is typically be zero, expires, the CM 104 sends the PTX grant 756 as usual. However, the CM 104 continues to refrain from forwarding media to the net until a second related timer, the net's wake-up timer 724, expires. Both timers reset when the CM 104 determines that the dormant net's floor can be granted. The value of the wake-up timer 724 should not be less than the value of the PTX dormancy response timer 728. After the wake-up timer 724 has expired, the CM 104 begins forwarding media and media signaling and traffic flow normally. Both timers are configurable on a per net basis.

If the CM 104 determines that it cannot grant the PTT request 704, it immediately signals the requesting CD 352 accordingly with a PTX deny message 708, and the net remains dormant.

A CD 352 that has entered the Dormant/Idle state 844 may require a system change, change service options, or experience some other service disruption that causes it to never receive and respond to the AYT "wake-up" message 908. The CM 104 maintains a third longer timer that also resets with the wake-up and PTX dormancy response timers. This longer late-riser timer (not shown) is also configurable on a per net basis. After the late-riser time expires, any CD 352 whose IAH response 916 to the AYT wake-up message 908 has not been received is removed from the net's list of active participants by the CM 104. Any such removed CD 352 to re-registers with the CM 104's SIP server 236 in order to once again become a net participant.

Due to potential delays associated in transitioning a CD 352 out of the Dormant/Idle state 844 to the connected state, both the CD 352 and the CM 104 may perform voice buffering to mitigate the transition delay perceived by the user.

Typically, the CD 352 user-interface signals the user, through visual or aural mechanisms, at least two milestones in the processing of a PTT key-press. First, the CD 352 signals that it has detected a PTT key-press. Later, the CD 352 signals that it has received the CM 104's PTX message response 868. If the PTX message response 868 grants permission to broadcast media, the CD 352 user-interface provides an indication that the user may begin talking to the net; otherwise, the CD 352 user-interface indicates that the user has been denied permission 856 to talk to the net.

When the net is not dormant, the latency between the transmission of the PTT request message and receipt of the corresponding PTX response message is relatively small, and the user grows accustomed to being granted permission to speak shortly after PTT button is keyed. However, when the net is dormant, a relatively significant delay may separate transmission of the PTT request 852 and receipt of the corresponding PTX message 856 or 868. The delay may occur because the CD 352 may have released its traffic channel and experiences a delay in re-establishing packet data service. The delay may also occur because the CM 104 waits until the net's wake-up timer has expired before sending the PTX message response 856 or 868. In this circumstance, the CD 352 may optimistically assume that the CM 104 eventually responds with a PTX grant response 868 and signal the user that the PTT request 876 has been granted. To allow the user to begin speaking "early," the CD 352 buffers voice internally, until either the PTX request arrives, or it consumes all available internal buffer space.

If the PTX message response arrives and the request is granted, the CD 352 may begin transmitting the (buffered) voice and operation proceeds normally. If the PTX message response arrives and the request is denied, the CD 352 signals the user that permission to talk to the net has been denied. Since the user has already started talking, this late denial may appear to be a priority conflict. Special care is taken in this circumstance to avoid unnecessarily confusing the user. The CM 104 signals the PTX deny message 856 as soon as possible to limit the length of time the user may talk under the assumption that the outstanding PTT request eventually will be granted.

If the PTX message does not arrive before all available internal buffer space is consumed, the CD 352 may simulate a PTX deny message 856 and signal the user to stop talking 856. If the CD 352 has not been able to re-establish service, it may also need to take other error action at this point and inform the user accordingly. Alternatively, if by this time, packet data service is reestablished, the CD 352 may, in this situation, begin transmitting voice media to the CM 104 without prior receipt of a PTX grant message response 868.

While waiting for the wake-up timer to expire, the CM 104 buffers any voice media received on a net's media channels from the CD 352 that has sent the outstanding PTT request 852 and eventually sends a corresponding PTX grant response 868. Once the wake-up timer expires, the CM 104 transmits the PTX grant response 868 to the requesting CD 352, broadcasts a PTA announcement to the net, and begins broadcasting the buffered voice media. If the CM 104's internal voice buffer is consumed before the wake-up timer expires, the CM 104 immediately transmits a PTX denial message 856 to the requesting CD 352. The treatment of the buffered voice is undefined, but the CM 104 may transmit the contents of its voice buffer to the net after the wake-up timer has expired. Once the wake-up timer has expired, net operation proceeds normally.

The size of the voice media buffer in the CD 352 is chosen based on the maximum time expected to transition to the IS-707.5 connected state 812 from the IS-707.5 dormant/idle state 844. Similarly, the size of the media buffer in the CM 104 should be chosen based on the (maximum) value of the net's wake-up timer specified in the CM 104's net database 232.

A more complete description of the states of the CM 104 follows. The CM 104 implements the NBS Media Signaling state diagram 600 shown in FIG. 15 for each instance of a net. The CM 104 initializes in an idle state 604 when a net is created. The net remains in the idle state 604 as long as no net participant request PTT 608 is granted for control of the floor 612 and the net is not dormant 618. The CM 104 resets the hang-time timer 620 to zero upon entering the idle state 604. The CM 104 transitions from the idle state 604 to the grant state 612 when a PTT request 608 from a net participant is received. The CM 104 transitions from the idle state 604 to the go-dormant state 624 when the hang-time timer expires.

The CM 104 transitions from the grant state 612 to the idle state 604 and sends a PTX deny 626 response to the requesting CD 352 if the arbitration algorithm denies control of the floor to the requesting CD 352. The CM 104 transitions from the grant state 612 to the announce state 628 and sends a PTX grant response 632 to the requesting CD 352 if the arbitration grants control of the floor to the requesting (or interrupting) CD 352. After sending the PTX grant response 632, the CM 104 considers the requesting (or interrupting) CD 352 the net's current talker. The CM 104 transitions from the announce state 628 to the talk state 636 and sends a PTA message 640 announcing the new talker to all net participants immediately upon entering the announce state 628. The current talker remains in the talk state 636 as long as no PTT request 644 or release message 648 is received from a net participant and the net's failsafe timer 652 has not expired. The CM 104 resets the net's failsafe timer 652 upon entering the talk state 636. While in the talk state 636, the CM 104 broadcasts media from the net's current talker to the net.

The CM 104 transitions from the talk state 636 to the arbitrate state 656 when the PTT request message 644 is received from a net participant. The CM 104 transitions from the talk state 636 to the release-confirm state 660 when the PTT release message 648 is received from the CD 352 with control of the net's floor. The CM 104 transitions from the talk state 636 to the failsafe-recover state 664 when the failsafe timer 652 expires. The user is typically given the amount of time remaining before the failsafe timer expires. The CM 104 broadcasts media traffic received from the net's current talker to the net while it remains in the talk state 636. If the net's media buffer is not empty, the CM 104 continues to buffer media received from the net's current talker while it broadcasts media traffic to the net.

The CM 104 enters the arbitrate state 656 as a result of receiving the PTT request message 644 while in the talk state 636. The CD 352 that originated the PTT request message 644 is known as the interrupting participant. If the interrupting participant and the current talker are identical, the CM 104's PTX grant message 668 was lost and the current talker is re-sending its PTT request 644. The CM 104 transitions from the arbitrate state 656 to the talk state 636 and sends the interrupting participant the PTX grant message 668 if the interrupting participant and the net's current talker are identical. The CM 104 applies the arbitration algorithm to the net's current talker and the interrupting participant immediately upon entering the arbitrate state 656 if the interrupting participant and the net's current talker are distinct.

The CM 104 transitions from the arbitrate state 656 to the talk state 636 and sends the interrupting participant a PTX deny message 672 if the arbitration algorithm rules in favor of the current talker. The CM 104 transitions from the arbitrate state 656 to the grant state 612 and sends the net's current talker a PTX interrupt message 676 if the arbitration algorithm rules in favor of the interrupting participant. The CM 104 transitions from the release-confirm state 660 to the release-announce state 680 and sends a PTX confirm message 684 to the current talker immediately upon entering the release-announce state 680.

The CM 104 transitions from the failsafe-recover state 664 to the release-announce state 680 and sends a PTX deny message 688 to the current talker immediately upon entering the failsafe-recover state 664. The CM 104 transitions from the release-announce state 680 to the idle state 604 and sends a PTA release announcement 692 to all net participants immediately upon entering the release-announce state 680. The CM 104 transitions from the go-dormant state 624 to the dormant state 618 and sends a ZZZ message 696 announcing the net has gone dormant to all net participants immediately upon entering the go-dormant state 624. The net's state machine remains in the dormant state 618 as long as no net participant requests control of the floor. The CM 104 transitions from the dormant state 618 to the wakeup state 706 when a PTT request 704 from a net participant is received.

The CM 104 transitions from the wakeup state 708 to the dormant state 618 and sends a PTX deny response 708 to the requesting CD 352 if the arbitration algorithm denies control of the floor to the requesting CD 352. Since the net is dormant, this can happen only if the requesting CD 352 has listen-only privileges. The CM 104 transitions from the wakeup state 706 to a wakeup-pending state 712 and sends a AYT wakeup request 716 to all net participants if the arbitration grants control of the floor to the requesting CD 352. After sending the AYT wakeup request 716, the CM 104 considers the requesting CD 352 the net's pending talker.

The CM 104 remains in the wakeup-pending state 712 as long as no PTT request message 720 is received from a net participant, a wake-up timer 724 has not expired and the a PTX dormancy response timer 728 has not expired. The CM 104 resets the wake-up timer 724 and the PTX dormancy response timer 728 upon entering the wakeup-pending state 712. The CM 104 transitions from the wake-up pending state 712 to the dormant-arbitrate state 732 when the PTT request message 720 is received from a CD 352 distinct from the net's pending talker. The CM 104 transitions from the wake-up pending state 712 to a dormant-grant state 736 when the net's wake-up timer 724 expires. The CM 104 transitions from the wake-up pending state 712 to a buffered-grant state 740 when the PTX dormancy response timer 728 expires.

The CM 104 applies the arbitration algorithm to the net's pending talker and the interrupting participant immediately upon entering the dormant-arbitrate state 732. The CM 104 transitions from the dormant-arbitrate state 732 to the wake-up pending state 712 and sends the interrupting participant a PTX deny message 744 if the arbitration algorithm rules in favor of the pending talker. The CM 104 transitions from the dormant-arbitrate state 732 to the wake-up pending state 712, sends the pending talker the PTX deny message 744, and considers the interrupting participant to be the net's new pending talker if the arbitration algorithm rules in favor of the interrupting participant.

The CM 104 transitions from the dormant-grant state 736 to the announce state 628 and sends a PTX grant response 748 to the net's pending talker immediately upon entering the dormant-grant state 736. The CM 104 transitions from the buffered-grant state 740 to a buffering state 752 and sends a PTX grant response 756 to the net's pending talker immediately upon entering the buffered-grant state 740. The net's state machine remains in the buffering state 752 as long as the wake-up timer 724 has not expired. While in the buffering state 752, the CM 104 buffers any media traffic received from the net's pending talker.

The CM 104 transitions from the buffering state 752 to the announce state 628 when the wake-up timer 724 expires. The CM 104 buffers any media traffic received from the net's pending talker in the net's media buffer while it remains in the buffering state 752. The CM 104 responds to any media signaling request that contains invalid or reserved field values by sending an ERR response 760 in an error state 764 to the CD 352 that sent the message and otherwise ignore the request.

The CD 352 implements the NBS Media Signaling state diagram 800 shown in FIG. 16 whenever a user is participating in a net. The CD 352 initializes to a startup state 804 after the CD 352 accepts the net's session description by sending a SIP ACK message 808 to the CM 104. The CD 352 transitions from the startup state 804 to a startup-wait state 812 and sends a ASK request message 816 to the CM 104 immediately upon entering the startup state 812.

The CD 352 remains in a listen state 820 as long as the user does not press the push-to-talk button 824, no PTA message 828 is received from the CM 104, and no sleep ZZZ message 832 is received from the CM 104. The CD 352 transitions from the listen state 820 to a floor-request state 836 when the user presses the push-to-talk button 824. The CD 352 transitions from the listen state 820 to a talker-announce state 840 when the PTA message 828 is received from the CM 104. The CD 352 transitions from the listen state 820 to a dormant-idle state 844 when the sleep ZZZ message is 832 received from the CM 104. The CD 352 transitions from the floor-request state 836 to a floor-wait state 848 and sends a PTT grant request 852 to the CM 104 immediately upon entering the floor-request state 836.

The CD 352 remains in the floor-wait state 848 as long as no PTX response message 856 is received from the CM 104 and a PTT Abort timer 860 has not expired. The CD 352 resets its PTT Abort Timer 860 and a PTT Retransmit Timer (not shown) upon entering the floor-wait state 848. The CD 352 transitions from the floor-wait state 848 to a talk state 864 and alerts the user that the user has gained control of the net's floor when a PTX grant 868 response message is received from the CM 104. The CD 352 transitions from the floor-wait state 848 to a floor-lost state 872 when the PTX deny message 856 is received from the CM 104. The CD 352 remains in the floor-wait state 848 and retransmits an identical PTT request 876 to the CM 104 after its PTT Retransmit Timer expires. The CD 352 transitions from the floor-wait state 848 to the listen state 820 after its PTT Abort Timer 860 expires. The CD 352 transitions from the talk state 864 to a floor-release state 880 if the user releases the push-to-talk button 884 while still waiting for a PTX response.

The CD 352 remains in the talk state 864 as long as no PTX interrupt message 888 is received from the CM 104 and the user has not released the push-to-talk button 884. The CD 352 transitions from the talk state 864 to the floor-lost state 872 when the PTX interrupt response message 888 is received from the CM 104. The CD 352 transitions from the talk state 864 to the floor-release state 880 when the user releases the push-to-talk button. The CD 352 remains in the talk state 864 when the PTX grant response message 868 is received from the CM 104. The CD 352 transitions from the floor-lost state 872 to the listen state 820 and alerts the user 892 with a message indicating that control of the net's floor has been lost immediately upon entering the floor-lost state 872.

The CD 352 transitions from the floor-release state 880 to a release-wait state 896 and sends a PTT release request 900 to the CM 104 immediately upon entering the floor-request state 836. The CD 352 remains in the release-wait state 896 as long as no PTX confirm response message 904 is received from the CM 104 and the PTT Abort timer 860 has not expired. The CD 352 resets its PTT Abort Timer 860 and a PTT retransmit timer upon entering the release-wait state 896. The PTT retransmit timer is activated each time there is a PTT request or release.

The CD 352 transitions from the release-wait state 896 to the listen state 820 when the PTX confirm response message 904 is received from the CM 104. The CD 352 remains in the release-wait state 896 and retransmits an identical PTT release request 900 to the CM 104 after its PTT Retransmit Timer expires. The CD 352 transitions from the release-wait state 896 to the listen state 820 after its PTT Abort Timer expires 860.

The CD 352 transitions from the talker-announce state 840 to the listen state 820 and announces the talker immediately upon entering the talker-announce state 840. The announcement can indicate that a new talker has control of the floor, the current talker has released the floor, or that no talker currently has control of the floor.

The CD 352 remains in the dormant-idle state 844 as long as no AYT request message 908 is received from the CM 104 and the user does not press the push-to-talk key 824. The CD 352 transitions from the dormant-idle state 844 to the dormant-wakeup state 912 when the AYT request message 908 is received from the CM 104. The CD 352 transitions from the dormant-idle state 844 to the floor-request state 836 when the user presses the push-to-talk key 824.

The CD 352 discards any sleep ZZZ message 916 received while in the dormant-idle state 844. The CD 352 transitions from the dormant-wakeup state 912 to the listen state 820 and sends an IAH response message 916 to the CM 104 immediately upon entering the dormant-wakeup state.

Upon receipt of an AYT ping request 920 received from the CM 104 while in any state other than the dormant-idle state 844, the CD 352 saves its current state, temporarily transitions to an IAH-reply state 924, builds and sends an IAH response message 928 to the CM 104, and return to its previous state. The CM 104 sends an ERR response 932 to the CD 352 when it receives a media signaling error and enters an error state 936, such as an malformed request making use of invalid or reserved field values.

Upon receipt of the ERR response 932 received from the CM 104 while in any state, the CD 352 alerts the user that an error has occurred, disables the CD 352 (940), and perform any appropriate SIP signaling to gracefully end its participation in the net 944.

When the CD 352 has entered one of the dormant state 844, the CD 352 may receive point-to-point voice services calls via another IS-707 service option, yet remain participants of a dormant net. After the voice services call is terminated, the CD 352 returns to the IS-707.5 dormant/idle state 844.

However, if the net comes out of the dormant state 844 while the CD 352 has chosen to receive a point-to-point voice service option call, the CD 352 may miss the AYT "wake-up" message request 908 and be removed from the list of active participants. In such instances, the CD 352 may determine its participant status by sending the CM 104 an ASK request 382. Once the CD 352 has been removed from the net's list of active participants, the CD 352 re-registers with the CM 104's SIP server in order to once again participate in the net.

The CD 352 allows the user to originate and receive conventional PSTN point-to-point calls as well as participate in group services discussions. Although the CD 352 may internally operate in one of several modes, the CD 352 avoids restricting certain functionality within the context of distinct operating modes that the user is required to explicitly navigate. Thus, seamless receipt and placement of point-to-point voice-services calls while group services are enabled and activated.

The CD 352 may be used to place a point-to-point voice services or secure point-to-point packet voice calls at any time, whether group services are active or not, as long as the CD 352 is not simultaneously acting as a talker. If the CD 352 has registered as a member of a net, the CD 352 unregisters from the net. If the selected point-to-point call is placed via a voice service option, the CD 352 terminates data services. Once the point-to-point call has been completed, the CD 352 may transparently enable packet data service and reregister as a member of the current selected net.

The CD 352 may be used to receive PSTN or secure point-to-point packet voice calls while group-services is enabled, within the limitations imposed by the cellular infrastructure. If the CD 352 joined a net, and the selected net is active, the CD 352 appears busy to an incoming PSTN call and the call is given the appropriate busy treatment by the cellular infrastructure. If the selected net is quiet but the net's hang-time 620 has not expired, the call is also given the normal busy treatment by the cellular infrastructure. However, if the selected net's hang-time 620 has expired, the net has been placed in dormant mode 618, and the CD 352 has released its over-the-air resources, the call may not be given busy treatment by the infrastructure and the CD 352 may be paged to initiate receipt of the incoming call.

While a voice services call is active, the CD 352 is unable to receive any NBS net traffic. After a voice services call has been completed, the CD 352 may be required to rejoin the net as it may have missed one or more AYT requests 716. Whenever the CD 352 appears busy to an incoming voice services call, the caller is redirected based on whatever busy treatment has been defined for the called CD 352 (such call forwarding, voice mail, etc.) by the cellular infrastructure, as expected. A user may optionally configure the CD 352 to disable receipt of incoming point-to-point calls while a net is selected and the CD 352 is registered as a member.

The CD 352 also detects if its IP network address has or is about to be changed. If the CD 352 is participating in a net when the address change occurs, the CD 352 again INVITE itself to the net, as discussed with respect to FIG. 11.

For example, a roaming CD 352 may switch cellular systems or cellular networks and thus negotiates a new IP network address. Or, the CD 352 may experience a service disruption or drop the packet data service option call for any reason and upon re-establishing service be assigned a new IP network address. If the CD 352 is participating in a net during an address change and does not rejoin the selected net in a timely fashion, the CM 104 eventually expires its membership and removes the CD 352 from the list for the selected net. The CD 352 is removed from the list of active net participants if it does not eventually respond to a series of media signaling AYT request messages 716.

In the absence of the IS-707.5 Packet Data Service Option, the NBS may operate over the existing and commonly available Quick Net Connect (QNC) packet service. However, QNC does not currently support dormancy. Accordingly, application level messages such as "go dormant" may be ignored by a CD 352 operating NBS over QNC.

QNC does provide a protocol stack similar to that provided by IS-707.5. The CD 352 may be configured to negotiate a packet connection using QNC rather than IS-707.5, and, if the QNC service is available, treats the connection as a packet data service option connection without dormancy or, optionally, CRTP header compression support.

Under Mobile IP, the CD 352 connects to the network using a foreign agent, which assigns the mobile a care-of address. The care-of address is temporary but legal address to which IP datagrams may be addressed from anywhere on the Internet. The mobile uses the care-of address to contact its home agent and inform it of the mobile's current care-of address. After confirming the identify of the mobile, the home agent then sends packets addressed to the mobile's permanent home address (which normal Internet routing mechanisms delivers to the home agent directly or to the home agent's network) to the mobile using the mobile's care-of address.

Although NBS can operate over Mobile IP, Mobile IP may potentially adversely impact the end-to-end latency and perceived voice quality of NBS media traffic and signaling. This may be in particular of significance if the CD 352 joins a net using its permanent address and the home agent is located far, in a network topology sense, from the CM 104 and the CD 352. In such a case, media traffic may optionally be routed over the public Internet or other variable quality of service networks, which may not have been required if Mobile IP was not used. To avoid this, it is preferable for the CD 352 to access NBS services using its care-of address and rejoin nets when its care-of address changes.

Both SIP call signaling and PGP public key encryption use a unique CD 352 user-id or similar unique identifier. The user database 232 defines an internal user identifier, which may be forwarded to and used by the CD 352 in media signaling requests. The CD 352 user-id address preferably does not contain any private data whose public disclosure might compromise the existing cellular infrastructure authentication mechanisms.

The CD 352 user address is used in the headers in SIP registration and invitation, and may be used to form other parts of the required SIP syntax. The user address is also an input to the generation of the private PGP key used to authenticate SIP requests. The CD 352 userinterface allows the user to view the user address. The CD 352 user-interface may allow the user to change the user address, at the risk of potentially disrupting the ability to access NBS or satisfy SIP authentication requests.

To guard against certain denial of service attacks and prevent CD 352 masquerading, the CM 104 may optionally request that the CD 352 authenticate itself prior to registering or joining a net. Authorization is performed at the application level, independent of other authorization schemes that may exist at the network or cellular infrastructure level. CD 352 authorization is also implemented, and operates, independently of concepts and data structures supporting encrypted (secure) NBS nets.

In particular, the CM 104 may request that the CD 352 include an "Authorization" header with its SIP requests. The authorization header allows for the SIP message to be signed by the CD 352 using PGP public key cryptography signatures.

Public key cryptography generates a public and private key from a private secret key, typically known only to the encryptor (in this case, the CD 352). The private key, in combination with the secret, is required to sign a message, but the public key alone can be used to verify a signed message's signature. Thus, to support SIP authorization, each CD 352 is preferably provisioned with a private secret and private key, which are never shared. Each CM 104 to which the CD 352 may need to authorize itself should know the public key of the CD 352. Since the public key is not secret, it may be stored as part of the user portion of the database 232 maintained by the CM 104, or accessed through generic public key servers on the Internet.

The CM 104 may require CD 352 authorization at the server, net, or user level. At the server level, the CM 104 requires all clients connecting to the CM 104's SIP server 236 (see FIG. 3) to provide authorization credentials, rejecting all requests that are not authorized. When server level authorization is enabled, only clients whose identities (i.e., a client's public key) are previously known to the CM 104 may effectively use the server. Server level authorization can protect the CM 104 SIP's server 236 from many relatively easy denial-of-service attacks.

A CM 104 may protect one or more nets it manages through authorization, but leave other nets "unprotected." If the CD 352 attempts to INVITE itself to a protected net, the CM 104's SIP server 236 rejects the request unless the CD 352 can be authorized by the CM 104.

Also, the CM 104 may use authorization to insure that the CD 352 (or any SIP user-agent client in general) does not attempt to masquerade as another CD 352 and hence either deny service to legitimate net participants or passively monitor a net's media channels. If the CM 104 requires that a specific CD 352 be authorized, the CM 104 does not accept any SIP requests from a client connecting as the CD 352 unless the client's SIP requests include a PGP signature that may be verified by the CM 104. At the user level, authentication may be configured on a per user basis (i.e., the CM 104 may require that certain users be authenticated before while allowing other users to remain unauthenticated).

The PGP private key may either be administratively provisioned within or created by the CD 352, once the CD 352 user address is defined. The private key need not be stored externally, but the associated public key is generally loadable into the user portion of the database 232 of any SIP server requiring CD 352 authentication.

In an embodiment, the primary NBS CD 352 or net participant platform is a CD 352 MA based cellular handset. Because NBS is built over IP and IP transport protocols, any IP capable platform with connectivity to the CM 104 may potentially serve as a NBS CD 352. Accordingly, dial-up users may connect to the CM 104 via the PSTN through existing IP terminal-servers operated by Internet Service Providers (ISP), as illustrated in FIG. 1. The terminal-server acts as a bridge between the PSTN and a LAN supporting IP. The terminal-server comprises a bank of modems, which provide a connection point for high-speed PSTN modems, a server, and one or more network interfaces. The server is capable of hosting multiple independent PPP sessions, one for each connected modem user. The server also acts as a router, routing IP packets between each of the individual PPP interfaces and any active LAN interfaces. The CM 104 either includes an integrated (or be deployed in conjunction with an external) commercial off-the-shelf terminal-server.

The dial-up terminal server supports and includes the ability to negotiate CRTP Header Compression over its PPP sessions. Similarly, the PPP stack used by a dial-up client also includes and attempts to use CRTP. However, because of the additional bandwidth available over high-speed modems, the inability for a dial-up based user to negotiate CRTP Header Compression may not necessarily force a net to avoid using RTP based payload specifications.

If the terminal-server is located on a CD 352 MA service provider's internal LAN, and hence near, in a network topology sense, to the service provider's CM 104, dial-up users may avoid quality-of-service issues that may contribute to high end-to-end latency if the path between the ISP's terminal-server and the CM 104 traverse a portion of the public Internet. Since PSTN based modems typically do not support a dormancy concept similar to that implemented by IS-707.5, dial-up based net participants ignore any sleep messages received from the CM 104. Although the user database 232 tracks whether a connecting user is cellular or land based, this facility is still provided. Accordingly, the CM 104 may or may not send sleep or other media signaling messages to dial-up users.

NBS service areas is designed to be integrated, both to allow users to roam between service areas as well as to join equivalent nets defined within separate service areas. Peer-to-peer communications between multiple CMs 104 takes the form of SIP server redirects, the exchange of user and net database records, and additional messages specific to an integrated NBS service.

In an integrated NBS service embodiment, it may be preferable to allow any CM 104 to assume ownership of a net. Thus, operation of a net is not specific to a particular CM 104 or MCU node 208. The choice of CM 104 may be determined dynamically, based on factors such as proximity to the majority of net participants and available quality of service on a service providers inter-system network. Similarly, any SIP redirect server 236 is capable of redirecting any CD 352 to the appropriate MCU's SIP user-agent server, and/or, if necessary, forwarding the CD 352 to another SIP redirect server.

In an integrated NBS service embodiment, a net's net-address has meaning throughout the NBS system. As a result, one or more top-level SIP servers 236 are responsible for redirecting INVITE requests and distributing net participants to the appropriate MCU nodes 208. The top-level SIP servers 236 may share a common user and net database 232, providing similar functionality and redirection decisions at different network rendezvous points. As a result, the redirection of CD 352 originated invitations provides an important and critical layer of abstraction that allows multiple CM 104 installations to be integrated into a single homogeneous NBS service.

In an integrated NBS service, the system scales by duplicating the functionality provided by the MCU node manager 256, its associated set of MCUs 252 (loosely termed an "MCU Cluster"), including its SIP user-agent server. A single database 232 and administration interface 248 is shared by all elements of the system.

The process by which a CD 352 joins a net in such an integrated system is substantially the same as to that used in a system comprised of a single CM 104 installation. The CD 352 initially sends all SIP requests to the top-level (now global) SIP redirect server 236. The redirect server 236 redirects, via SIP mechanisms, the requesting CD 352 to the appropriate destination. In the case of an INVITE request to join a net, the destination is the SIP user-agent server 252 associated with the MCU node 208 with current responsibility for the net in question. In the case of an INVITE requesting a current list of nets available to the CD 352, the destination is any user-agent capable of responding to the request.

Separately, the redirect server 236 may exchange additional messages with the MCU 252 via inter-application messaging using implementation-specific protocols and/or messaging conventions. As in the non-integrated case, special startup action may be necessary to ensure that the redirect server 236 may determine a destination for every legitimate INVITE requests it receives. One embodiment has the SIP registrations existing at the top-level redirect server 236. Also, the top-level server may query the system database and attempt to map each invitation request to a net definition contained therein.

The CD 352 may offer encrypted net broadcast communications. At the option of net users, voice and data transmitted on a particular net may be encrypted at the transmitting CD 352, and decrypted by all other CDs on the net. Encryption is end-to-end, i.e., from CD to another. Net communications are typically encrypted by a commercial encryption algorithm incorporated in a NBS capable CD. The choice of whether a CD 352 treats a net as encrypted or unencrypted is at the discretion of the net users; that is, involvement of the CM 104 is not required.

Users may select on a net by net basis whether they would prefer traffic transmitted/received on that net to be encrypted/decrypted. The user is given the capability to enter an encryption key for the net using, for example, the phone keypad. The user is thus be capable of engaging in encrypted communications with other users of the net who have also selected the encryption option for that net and who are also using the same encryption key.

The user may enable or disable the encryption of net traffic for any net key that the user has entered into the CD 352 at any time. Media traffic may be symmetrically encrypted through the use of a symmetric key (a traffic encryption key, or TEK) that is shared by net users. Net traffic encryption keys may be generated off-line by a net user or net administrator and then securely distributed to net participants who manually enter the keys into their respective communication devices. The key is used for media traffic over a particular net, until new keys are generated and distributed to the net users to replace the previous net TEK.

The CD 352 is notified that it is a member of a particular net through messages received from the CM 104. The net administrator for a specific net may set an advisory flag that indicates that the net is intended to be encrypted. This indication is generally advisory, and does not necessarily authoritatively indicate that communications on the net are actually encrypted. The CD 352 user interface allows a user to designate any net as an encrypted net, and allow the user to input the net TEK from the CD 352, independently of whether an encrypted advisory flag for the net has been received by the CM 104.

The CD 352 may enforce minimum and maximum key lengths. The CD 352 may provide a means for a key checksum to be input along with the key, and if provided, to check the checksum against the key entered. If the checksum is not entered, the CD 352 calculates the checksum and makes it available for display to the user. The CD 352 does not necessarily display the key on the CD 352 display after initial key entry.

Once a key is successfully entered for a given net, media transmissions on the net is encrypted using that particular key, and all traffic received on the net is decrypted using that particular key. The encrypted traffic includes additional headers that allow the CD 352 to synchronize the encryption/decryption process, to allow for late synchronization (synchronization to a transmission already in progress), and to confirm that the sender and receiver are using identical traffic encryption keys. If a CD 352 receives encrypted traffic (detected by the presence of the encryption headers) on a net that it has not designated as encrypted, the CD 352 indicates that it is receiving encrypted traffic to the user, and does not output traffic (mute the audio or suppress data output). Similarly, if the CD 352 receives media traffic that is not encrypted on a net for which it is configured to encrypt, or if the traffic is not decrypted correctly (for instance if the keys are incompatible) the CD 352 alerts the user and mute the traffic.

The key for an encrypted net may simply be a random (binary) number. In general, the key may be generated by one party in a net, or an administrator for that net, and distributed securely to the net participants. Since the key distribution policy is currently left to the net users, it is a potential source of compromise of the net security. Thus, it is recommended that the net encryption key be distributed using secure means, such as PGP encrypted e-mail, to the net participants. The security manager 20 (FIG. 1) also provides a central repository for common net keys. Other methods are also possible, such as a standard telephone call or face-to-face meeting. Keys may also be distributed automatically to CDs, using an imbedded PGP secret key into a communication device for SIP authentication.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

Other features and advantages of the invention are set forth in the following claims.

The invention claimed is:

1. A method for arbitrating between a first communication device having floor control in a group communication network and a second communication device competing for floor control, the method comprising:
   receiving a floor-control request from the second communication device;
   comparing respective priority levels of the first communication device and the second communication device; and
   granting floor control to the second communication device if the second communication device has a higher or equal priority level and wherein the priority levels are dynamically assigned and a priority assigned to a particular communication device is a fixed value defined in a database maintained by a session initiation protocol (SIP) server and an arbitration algorithm is used to arbitrate conflicts and this algorithm can be individually configured on a per net basis.

2. The method of claim 1, wherein the receiving includes receiving the request from a push-to-talk (PTT) device.

3. The method of claim 1, further including:
   interrupting the first communication device after said granting floor control to the second communication device.

4. The method of claim 1, further including:
informing participating communication devices in the network that the second communication device has the floor control.

5. The method of claim 1, wherein if the second communication device has a lower priority level, informing the second communication device that it has been denied floor control.

6. A method for arbitrating between a first communication device and a second communication device competing for floor control in a group communication network, the method comprising:
receiving a first floor-control request from the first communication device;
placing the first communication in a wake-up state;
receiving a second floor-control request from the second communication device;
comparing respective priority levels of the first communication device and the second communication device;
placing the second communication device in the wake-up state if the second communication device has a higher or equal priority level and wherein the priority levels are dynamically assigned and a priority assigned to a particular communication device is a fixed value defined in a database maintained by a session initiation protocol (SIP) server and an arbitration algorithm is used to arbitrate conflicts and this algorithm can be individually configured on a per net basis.

7. The method of claim 6, wherein the receiving includes receiving the request from a push-to-talk (PTT) device.

8. The method of claim 6, further including:
bringing the first communication device out of the wake-up state after said granting floor control to the second communication device.

9. The method of claim 6, further including:
informing participating communication devices in the network that the second communication device has been placed in the wake-up state.

10. The method of claim 6, wherein if the second communication device has a lower priority level, informing the second communication device that it has been denied floor control.

11. A computer-readable medium embodying a method for arbitrating between a first communication device having floor control in a group communication network and a second communication device competing for floor control, the method comprising:
receiving a floor-control request from the second communication device;
comparing respective priority levels of the first communication device and the second communication device;
granting floor control to the second communication device if the second communication device has a higher or equal priority level and wherein the priority levels are dynamically assigned and a priority assigned to a particular communication device is a fixed value defined in a database maintained by a session initiation protocol (SIP) server and an arbitration algorithm is used to arbitrate conflicts and this algorithm can be individually configured on a per net basis.

12. A computer-readable medium embodying a method for arbitrating between a first communication device and a second communication device competing for floor control in a group communication network, the method comprising:
receiving a first floor-control request from the first communication device;
placing the first communication in a wake-up state;
receiving a second floor-control request from the second communication device;
comparing respective priority levels of the first communication device and the second communication device;
placing the second communication device in the wake-up state if the second communication device has a higher or equal priority level and wherein the priority levels are dynamically assigned and a priority assigned to a particular communication device is a fixed value defined in a database maintained by a session initiation protocol (SIP) server and an arbitration algorithm is used to arbitrate conflicts and this algorithm can be individually configured on a per net basis.

13. An apparatus for arbitrating between a first communication device having floor control in a group communication network and a second communication device competing for floor control, comprising:
means for receiving a floor-control request from the second communication device;
means for comparing respective priority levels of the first communication device and the second communication device;
means for granting floor control to the second communication device if the second communication device has a higher or equal priority level and wherein the priority levels are dynamically assigned and a priority assigned to a particular communication device is a fixed value defined in a database maintained by a session initiation protocol (SIP) server and an arbitration algorithm is used to arbitrate conflicts and this algorithm can be individually configured on a per net basis.

14. An apparatus for arbitrating between a first communication device and a second communication device competing for floor control in a group communication network, comprising:
means for receiving a first floor-control request from the first communication device;
means for placing the first communication in a wake-up state;
means for receiving a second floor-control request from the second communication device;
means for comparing respective priority levels of the first communication device and the second communication device;
means for placing the second communication device in the wake-up state if the second communication device has a higher or equal priority level and wherein the priority levels are dynamically assigned and a priority assigned to a particular communication device is a fixed value defined in a database maintained by a session initiation protocol (SIP) server and an arbitration algorithm is used to arbitrate conflicts and this algorithm can be individually configured on a per net basis.

15. An apparatus for arbitrating between a first communication device having floor control in a group communication network and a second communication device competing for floor control, comprising:
a receiver to receive information over the network;
a transmitter to transmit information over the network; and
a processor communicatively coupled to the receiver and the transmitter, the processor being capable of:
receiving a floor-control request from the second communication device;
comparing respective priority levels of the first communication device and the second communication device;

granting floor control to the second communication device if the second communication device has a higher or equal priority level and wherein the priority levels are dynamically assigned and a priority assigned to a particular communication device is a fixed value defined in a database maintained by a session initiation protocol (SIP) server and an arbitration algorithm is used to arbitrate conflicts and this algorithm can be individually configured on a per net basis.

16. An apparatus for arbitrating between a first communication device and a second communication device competing for floor control in a group communication network, comprising:
a receiver to receive information over the network;
a transmitter to transmit information over the network; and
a processor communicatively coupled to the receiver and the transmitter, the processor being capable of:
receiving a first floor-control request from the first communication device;
placing the first communication in a wake-up state;
receiving a second floor-control request from the second communication device;
comparing respective priority levels of the first communication device and the second communication device;
placing the second communication device in the wake-up state if the second communication device has a higher or equal priority level and wherein the priority levels are dynamically assigned and a priority assigned to a particular:r communication device is a fixed value defined in a database maintained by a session initiation protocol (SIP) server and an arbitration algorithm is used to arbitrate conflicts and this algorithm can be individually configured on a per net basis.

17. A method for arbitrating between a first communication device having floor control in a group communication network and a second communication device competing for floor control, the method comprising:
receiving a floor-control request from the second communication device;
comparing respective priority levels of the first communication device and the second communication device using a push-to-talk (PTT) arbitration algorithm for resolving arbitration conflicts;
granting floor control to the second communication device if the second communication device has a higher or equal priority level and wherein the priority levels are dynamically assigned and a priority assigned to a particular communication device is a fixed value defined in a database maintained by a session initiation protocol (SIP) server and an arbitration algorithm is used to arbitrate conflicts and this algorithm can be individually configured on a per net basis.

18. A method for arbitrating between a first communication device and a second communication device competing for floor control in a group communication network, the method comprising:
receiving a first floor-control request from the first communication device operating in a first state;
placing the first communication device in a second state;
receiving a second floor-control request from the second communication device operating in a first state;
comparing respective priority levels of the first communication device and the second communication device;
placing the second communication device in a second state if the second communication device has a higher or equal priority level and wherein the priority levels are dynamically assigned and a priority assigned to a particular communication device is a fixed value defined in a database maintained by a session initiation protocol (SIP) server and an arbitration algorithm is used to arbitrate conflicts and this algorithm can be individually configured on a per net basis.

19. A computer-readable medium embodying a method for arbitrating between a first communication device and a second communication device competing for floor control in a group communication network, the method comprising:
receiving a first floor-control request from the first communication device operating in a first state;
placing the first communication device in a second state;
receiving a second floor-control request from the second communication device operating in a first state;
comparing respective priority levels of the first communication device and the second communication device;
placing the second communication device in a second state if the second communication device has a higher or equal priority level and wherein the priority levels are dynamically assigned and a priority assigned to a particular communication device is a fixed value defined in a database maintained by a session initiation protocol (SIP) server and an arbitration algorithm is used to arbitrate conflicts and this algorithm can be individually configured on a per net basis.

20. An apparatus for arbitrating between a first communication device and a second communication device competing for floor control in a group communication network, the method comprising:
means for receiving a first floor-control request from the first communication device operating in a first state;
means for placing the first communication device in a second state;
means for receiving a second floor-control request from the second communication device operating in a first state;
means for comparing respective priority levels of the first communication device and the second communication device;
means for placing the second communication device in a second state if the second communication device has a higher or equal priority level and wherein the priority levels are dynamically assigned and a priority assigned to a particular communication device is a fixed value defined in a database maintained by a session initiation protocol (SIP) server and an arbitration algorithm is used to arbitrate conflicts and this algorithm can be individually configured on a per net basis.

* * * * *